United States Patent
Sugawara et al.

(10) Patent No.: US 12,306,460 B2
(45) Date of Patent: May 20, 2025

(54) LENS DRIVING DEVICE, CAMERA MODULE, AND CAMERA-EQUIPPED DEVICE

(71) Applicants: Masayoshi Sugawara, Tokyo (JP); Shun Suzuki, Tokyo (JP)

(72) Inventors: Masayoshi Sugawara, Tokyo (JP); Shun Suzuki, Tokyo (JP)

(73) Assignee: MITSUMI ELECTRIC CO., LTD., Tokyo (JP)

(*) Notice: Subject to any disclaimer, the term of this patent is extended or adjusted under 35 U.S.C. 154(b) by 478 days.

(21) Appl. No.: 17/907,411

(22) PCT Filed: Mar. 11, 2021

(86) PCT No.: PCT/JP2021/009773
§ 371 (c)(1),
(2) Date: Sep. 27, 2022

(87) PCT Pub. No.: WO2021/200012
PCT Pub. Date: Oct. 7, 2021

(65) Prior Publication Data
US 2023/0121120 A1    Apr. 20, 2023

Related U.S. Application Data

(60) Provisional application No. 63/002,300, filed on Mar. 30, 2020.

(51) Int. Cl.
*G02B 7/10*    (2021.01)
(52) U.S. Cl.
CPC ................... *G02B 7/102* (2013.01)

(58) Field of Classification Search
None
See application file for complete search history.

(56) References Cited

U.S. PATENT DOCUMENTS

| 2007/0050799 | A1* | 3/2007 | Kim ................. G11B 7/0935 |
| | | | 720/683 |
| 2009/0072818 | A1* | 3/2009 | Mizuno .............. G01D 5/145 |
| | | | 324/207.24 |
| 2019/0320119 | A1* | 10/2019 | Miyoshi .............. H04N 23/663 |
| 2023/0161229 | A1* | 5/2023 | Kim .................... H04N 23/57 |
| | | | 359/824 |
| 2024/0302712 | A1* | 9/2024 | Kim .................... H04N 23/54 |

FOREIGN PATENT DOCUMENTS

JP    2018-036416 A    3/2018

OTHER PUBLICATIONS

International Search Report from International Application No. PCT/JP2021/009773 mailed May 25, 2021.

* cited by examiner

*Primary Examiner* — Shan Liu
(74) *Attorney, Agent, or Firm* — Shih IP Law Group, PLLC.

(57) ABSTRACT

This lens driving device is provided with a movable part, a driving part, a magnet part having a first pole and a second pole, and a position detection part that is disposed to face the magnet part, and detects the position of the magnet part by detecting a magnetic field on a plane including an optical axis direction and a width direction. A boundary extends while bending such that the angle formed with the optical axis direction changes.

12 Claims, 20 Drawing Sheets

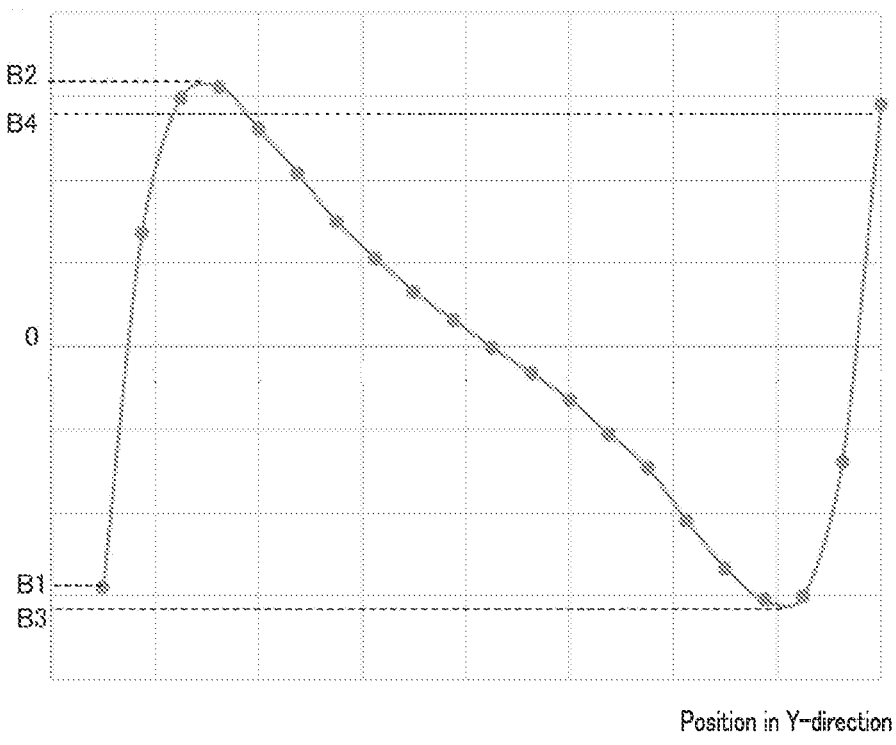
FIG. 22
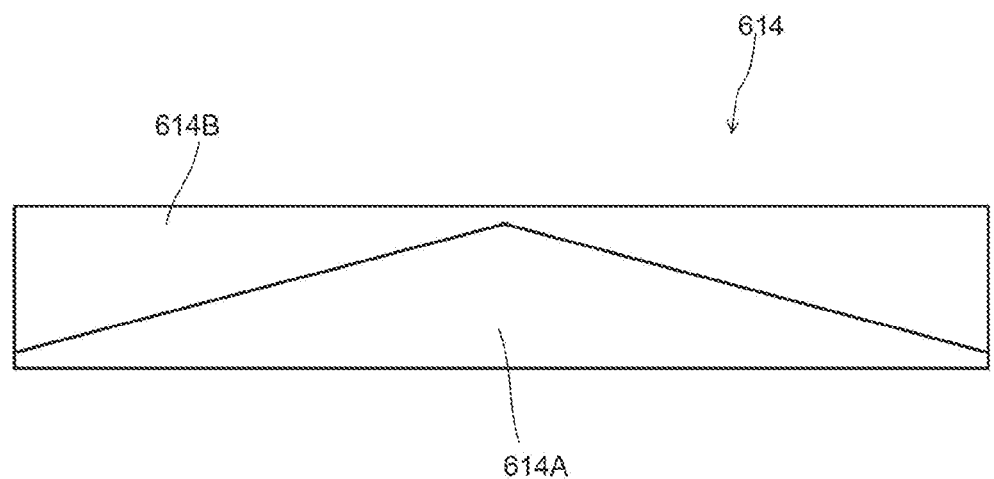
FIG. 23
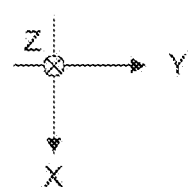

LENS DRIVING DEVICE, CAMERA MODULE, AND CAMERA-EQUIPPED DEVICE

TECHNICAL FIELD

The present invention relates to a lens driving device, a camera module, and a camera-mounted device.

BACKGROUND ART

Conventionally, a camera module mounted on a thin camera-mounted device such as a smartphone is known. Such a camera module is known to include a lens driving device having a zoom function for enlarging or downsizing a subject image.

For example, PTL 1 discloses a configuration including a fixed lens on which light from a subject is incident, two movable lenses on which the light deflected by the fixed lens is incident, and a lens driving part for moving the two movable lenses in the direction of the optical axis.

In such a lens driving device, in order to detect the position of a movable lens in the direction of the optical axis, a magnet part and a position detecting part (for example, a Hall element) for detecting the magnetic flux of the magnet part are disposed in a movable part in which the movable lens is disposed. The magnet part is disposed such that, for example, two different poles (N pole and S pole) are disposed adjacently to each other, and the magnetic force at a portion of the magnet part facing the position detecting part changes depending on the position of the movable lens.

CITATION LIST

Patent Literature

PTL 1

Japanese Patent Application Laid-Open No. 2018-36416

SUMMARY OF INVENTION

Technical Problem

However, for example, in a small-sized camera-mounted device, when the position of the magnet part deviates from a desired position due to an assembly error or the like in a direction in which the two different poles face each other, the positional relationship of the magnet part with respect to the position detecting part also deviates. Accordingly, there is a possibility that the movable lens cannot be accurately detected.

An object of the present invention is to provide a lens driving device, a camera module, and a camera-mounted device capable of accurately detecting the position of a movable lens.

Solution to Problem

A lens driving device according to the present invention includes:
 a movable part disposed in a direction of an optical axis and configured to hold a movable lens;
 a driving part for driving the movable part in the direction of the optical axis;
 a magnet part disposed on the movable part, extending in the direction of the optical axis, and having a first pole and a second pole disposed adjacently to each other via a border in a width direction orthogonal to the direction of the optical axis; and
 a position detecting part disposed to face the magnet part and configured to detect a position of the magnet part by sensing a magnetic field in a plane including the direction of the optical axis and the width direction, in which
 the border extends in a curved manner such that an angle formed between the border and the direction of the optical axis changes.

A camera module according to the present invention includes:
 the aforementioned lens driving device;
 a lens part including the movable lens held by the movable part; and
 an image capturing part configured to capture a subject image imaged by the lens part, in which
 the movable lens is driven in the direction of the optical axis.

A camera-mounted device according to the present invention is
 a camera-mounted device that is an information apparatus or a transporting apparatus, the camera-mounted device including:
 the above-described camera module; and
 an image capturing control part that processes image information obtained by the camera module.

Advantageous Effects of Invention

According to the present invention, it is possible to accurately detect the position of the movable lens.

BRIEF DESCRIPTION OF DRAWINGS

FIG. 22 is a diagram illustrating a change in the magnetic flux density at each position of the frame in the Y direction;

FIG. 23 is a diagram illustrating a configuration of a magnet part according to a modification;

DESCRIPTION OF EMBODIMENTS

Figure 1:
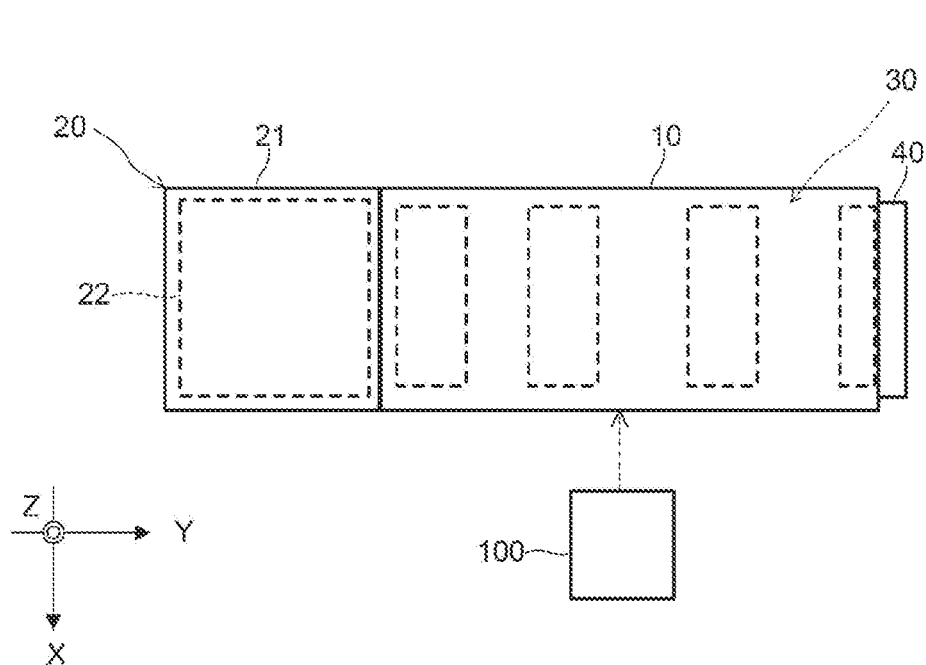
FIG. 1 schematically illustrates a camera module according to an embodiment of the present invention.
Figure 2:
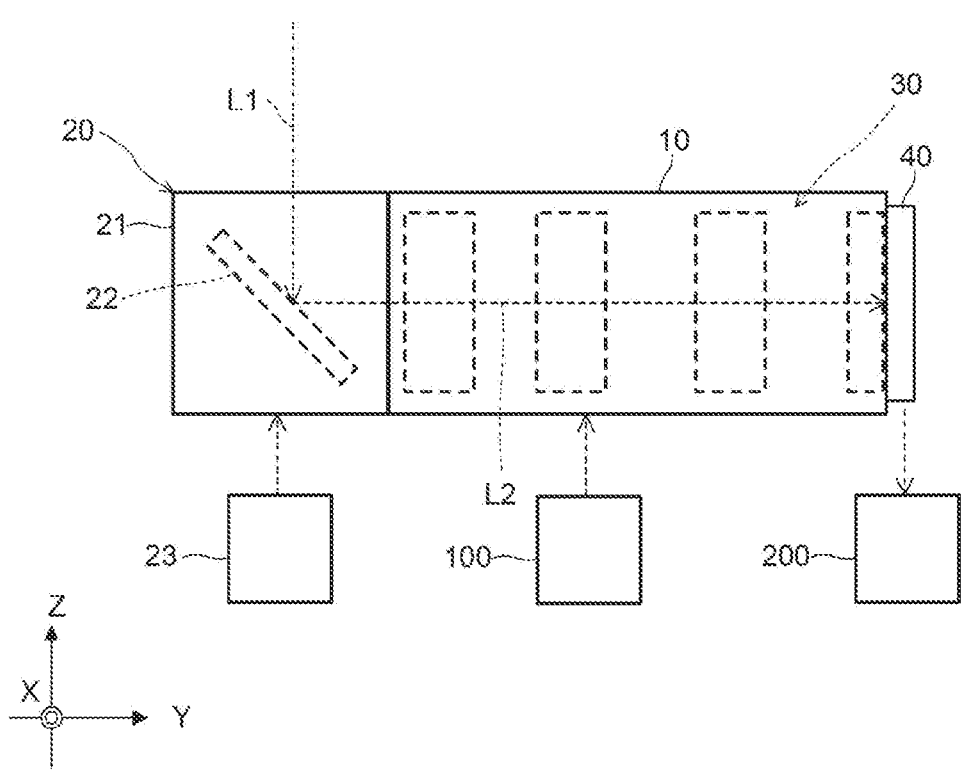
FIG. 2 schematically illustrates a configuration of the camera module as seen in a side view according to the present embodiment.

Hereinafter, embodiments of the present invention will be described in detail with reference to the drawings. FIG. 1 is a diagram schematically illustrating camera module 1 according to an embodiment of the present invention. FIG. 2 is a diagram schematically illustrating a configuration of camera module 1 according to the present embodiment as viewed from the side.

Figure 28A:
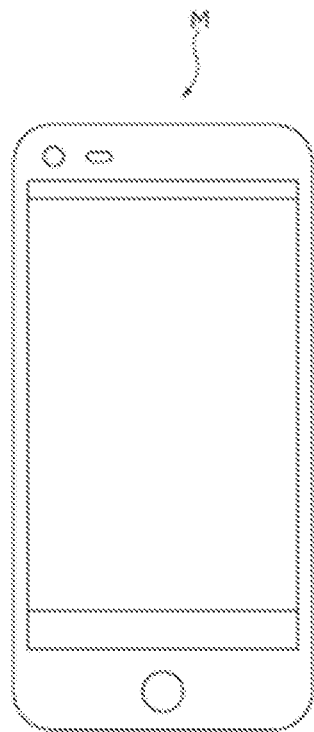
FIG. 28A is a diagram illustrating a smartphone in which the camera module is mounted.
Figure 28B:
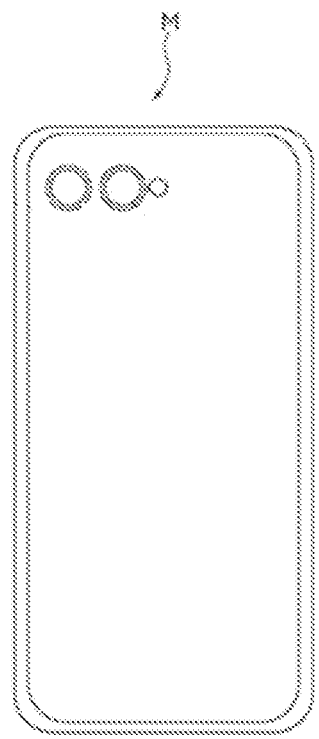
FIG. 28B is a diagram illustrating the smartphone in which the camera module is mounted.

Camera module 1 is mounted in thin camera-mounted devices such as, for example, smartphone M (see FIGS. 28A and 28B), a mobile phone, a digital camera, a notebook personal computer, a tablet terminal, a portable game machine, in-vehicle camera, and the like.

In explaining the structure of camera module 1 of the present embodiment, an orthogonal coordinate system (X, Y, Z) is used. The same orthogonal coordinate system (X, Y, Z) is also used for illustration of below-mentioned figures. Camera module 1 is mounted such that the horizontal direction is the X-direction, the vertical direction is the Y-direction, and the front-rear direction is the Z-direction, for example, during actually capturing an image with a camera-mounted device. Light from a subject is incident from the − side (minus side) in the Z direction, and is deflected and guided to the + side (plus side) in the Y direction. By reducing the thickness of camera module 1 in the Z direction, it is possible to reduce the thickness of the camera-mounted device.

As illustrated in FIG. 1, camera module 1 includes housing 10, reflection driving part 20, lens part 30, image capturing part 40, support shafts 50 (see FIG. 3), lens driving parts 60 (see FIG. 5), position detecting part 70 (see FIG. 10), and drive control part 100.

Drive control part 100 includes a Central Processing Unit (CPU), Read Only Memory (ROM), Random Access Memory (RAM), or the like. The CPU reads a program suited to processing contents out of the ROM, develops the program in the RAM, and integrally controls an operation of each block of lens driving parts 60 in cooperation with the developed program. Thus, drive control part 100 drives, in the Y direction (the direction of the optical axis), second lens unit 32 and third lens unit 33 to be described later of lens part 30 housed in housing 10. As a result, camera module 1 performs stepless optical zoom and autofocus. Housing 10, support shafts 50, lens driving parts 60, position detecting part 70, and drive control part 100 correspond to the "lens driving device" of the present invention.

Further, as illustrated in FIG. 2, in camera module 1, incident light L1 is incident on housing 10 via reflection driving part 20. Reflection driving part 20 includes reflecting housing 21, mirror 22, and reflection drive control part 23. In the example illustrated in FIGS. 1 and 2, reflecting housing 21 is disposed adjacent to an end portion of housing 10 on the − side in the Y direction. Mirror 22 is disposed in reflecting housing 21, and reflects incident light L1 toward housing 10 as reflected light L2. Reflection drive control part 23 includes a CPU, a ROM, a RAM, and the like, and controls the orientation of mirror 22.

Mirror 22 according to the present embodiment has two rotation axes (not illustrated) extending in the X direction and the Y direction. In reflection driving part 20, mirror 22 is rotated about the rotation axes under the control of reflection drive control part 23. Thus, camera module 1 has a shake correction function (Optical Image Stabilization (OIS) function) for optically correcting a shake (vibration) that occurs during capturing an image, so as to reduce image irregularities.

Reflected light L2 incident on housing 10 is outputted to image capturing part 40 via lens part 30 accommodated in housing 10.

Image capturing part 40 is disposed on the outer surface of housing 10 on the + side in the Y-direction (placement portion 112B of second wall 112 to be described later), and is configured to allow reflected light L2 to be incident thereon through lens part 30. Image capturing part 40 includes an image capturing device, a board, and the like (not illustrated).

The image capturing device is composed of, for example, a Charge-Coupled Device (CCD) image sensor, a Complementary Metal Oxide Semiconductor (CMOS) image sensor, or the like. The image capturing device is mounted on the board and electrically connected to the interconnections on the board via bonding wires. The image capturing device captures a subject image imaged by lens part 30 and outputs an electrical signal corresponding to the subject image.

Further, a printed wiring board (not illustrated) is electrically connected to the board of image capturing part 40. The power supply to the image capturing device and the output of the electrical signal of the subject image imaged by the image capturing device are performed via the printed wiring board. The electrical signal is outputted to image capturing control part 200 disposed in the camera-mounted device. Image capturing control part 200 includes a CPU, a ROM, a RAM, and the like, and processes image information obtained by camera module 1. Image capturing control part 200 may be mounted on the camera-mounted device, or may also be built in camera module 1.

Figure 3:
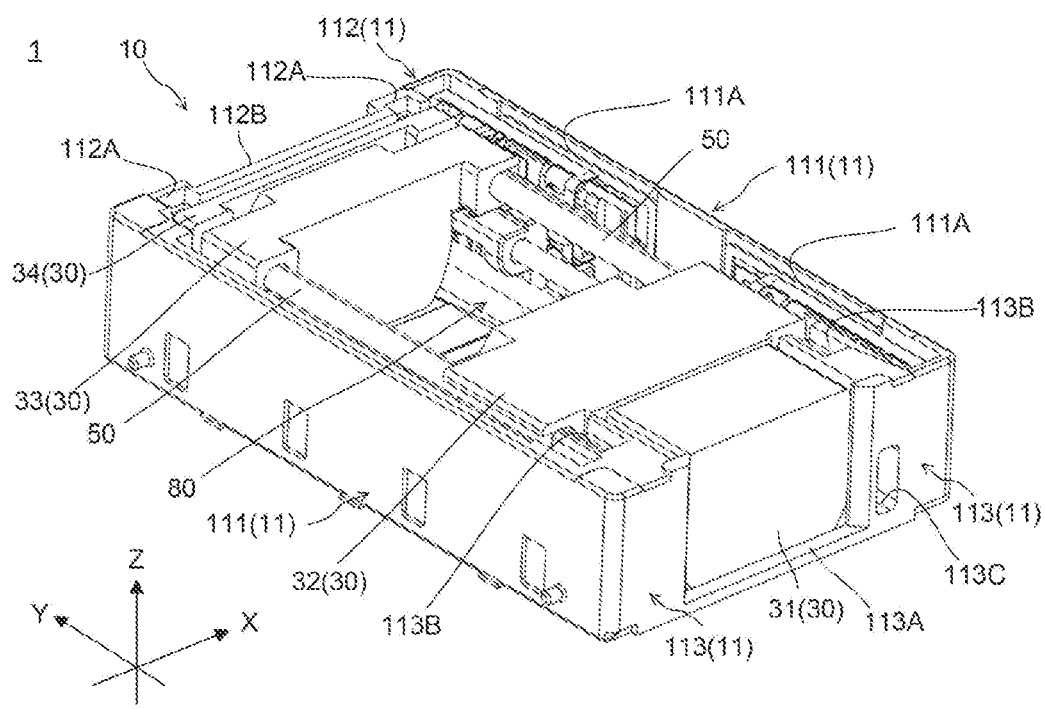
FIG. 3 is a perspective view illustrating a housing portion of the camera module.

As illustrated in FIG. 3, housing 10 houses lens part 30, support shafts 50, and lens driving parts 60 (see also FIG. 5), and for example, has a rectangular parallelepiped shape as a whole. Housing 10 has side wall portion 11, and bottom wall portion 12.

Figure 7:
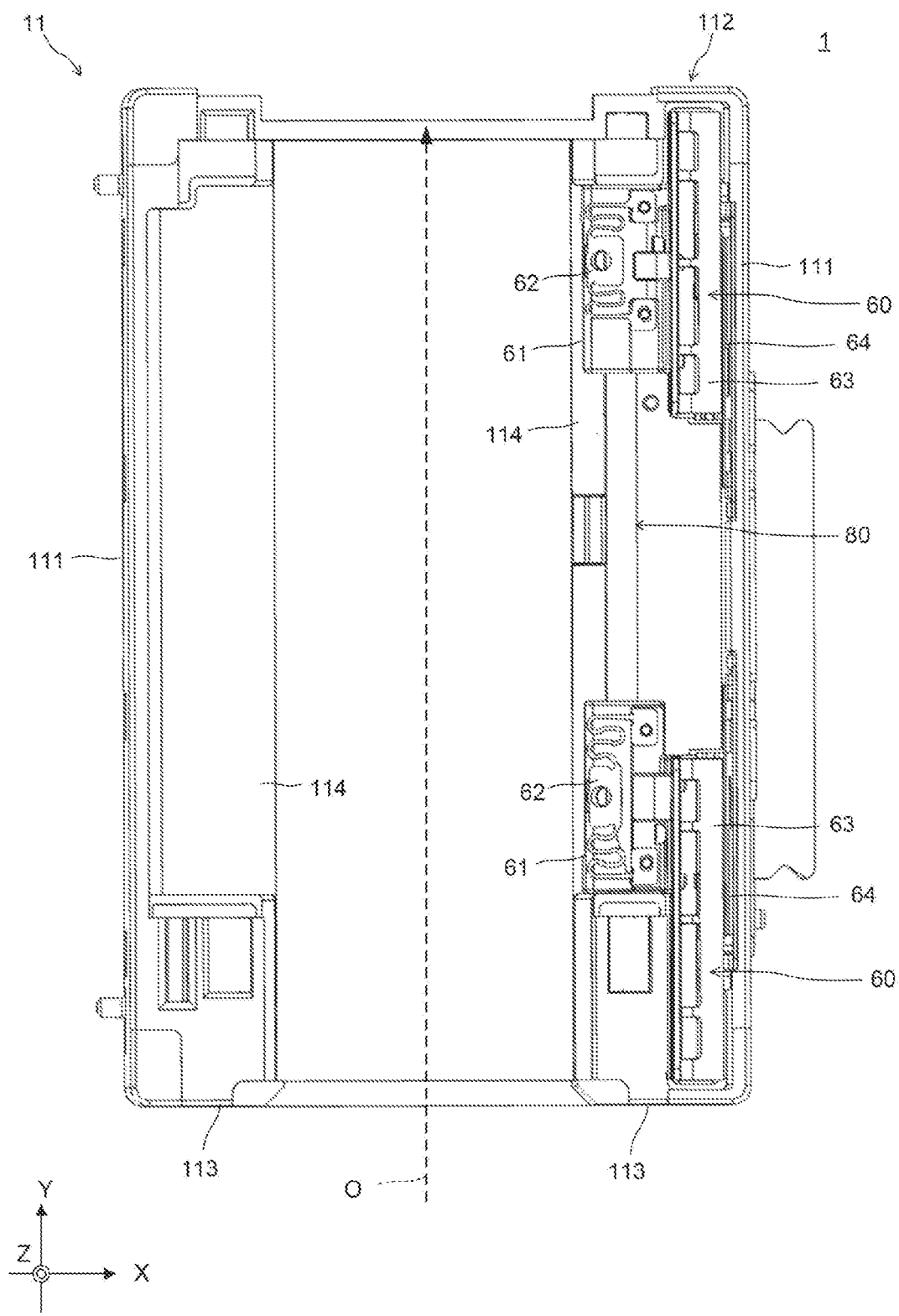
FIG. 7 illustrates the housing as seen from the + side in the Z direction.

Side wall portion 11 is a wall portion made of, for example, resin and having a portion opening on the − side in the Y direction, and has first walls 111, second wall 112, third wall 113, and fourth wall 114 (see also FIG. 7 and the like).

A pair of first walls 111 are configured to extend in the Y direction, and are disposed on both sides in the X direction. Of the pair of first walls 111, the inner surface of first wall 111 of housing 10 on the + side in the X-direction, placement portions 111A on which an ultrasonic motor to be described later is disposed are provided. On one of first walls 111 situated on the + side in the X direction, placement portions 111A are disposed on both sides of the central portion in the Y direction.

Figure 4:
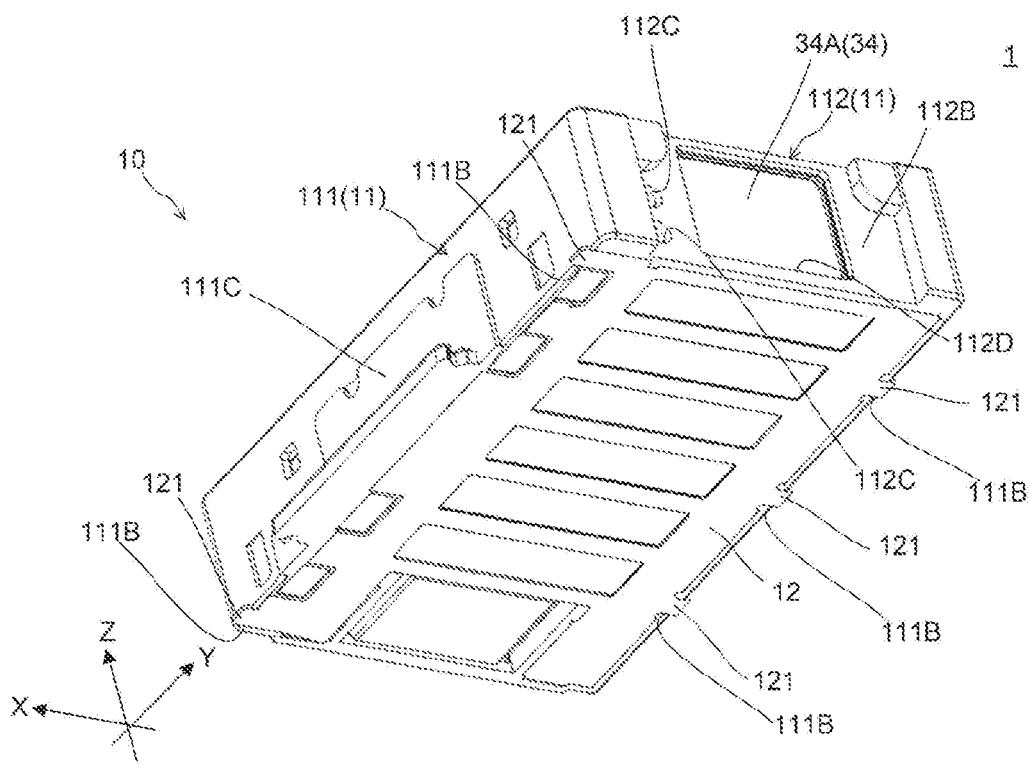
FIG. 4 is a perspective view of a bottom wall portion side of the housing portion of the camera module.

Further, as illustrated in FIG. 4, terminal portion 111C is disposed on first wall 111 on the + side in the X direction. Terminal portion 111C includes a terminal disposed across the inside and outside of housing 10 via a gap formed between first wall 111 and bottom wall portion 12, for example (not illustrated). A portion of the terminal disposed outside housing 10 is connected to predetermined interconnections of the camera-mounted device.

Further, engaged portions 111B with which positioning portions 121 of bottom wall portion 12 are engaged are formed in the bottom surface of first wall 111 (the surface on the − side in the Z direction).

As illustrated in FIGS. 3 and 4, second wall 112 is configured to extend in the X direction, and is disposed to connect together the end portions of the pair of first walls 111 on the + side in the Y direction. Further, in portions of the top surface of second wall 112 (the surface on the + side in the Z direction), supporting parts 112A for supporting support shafts 50 are provided on both sides in the X direction, respectively. Placement portion 112B on which image capturing part 40 is disposed is disposed on the outer surface of second wall 112.

Further, guide supporting portions 112C and opening portion 112D are formed in placement portion 112B of second wall 112. In the present embodiment, guide supporting portions 112C are holes for supporting guide shafts 81 and 82 to be described later, and are formed on the − side of opening portion 112D in placement portion 112B in the X-direction. Two guide supporting portions 112C are formed side by side in the Z-direction. Opening portion 112D is an opening in which fourth lens unit 34 of lens part 30 is fitted, and is formed in placement portion 112B at the central portion in the X-direction.

Figure 5:
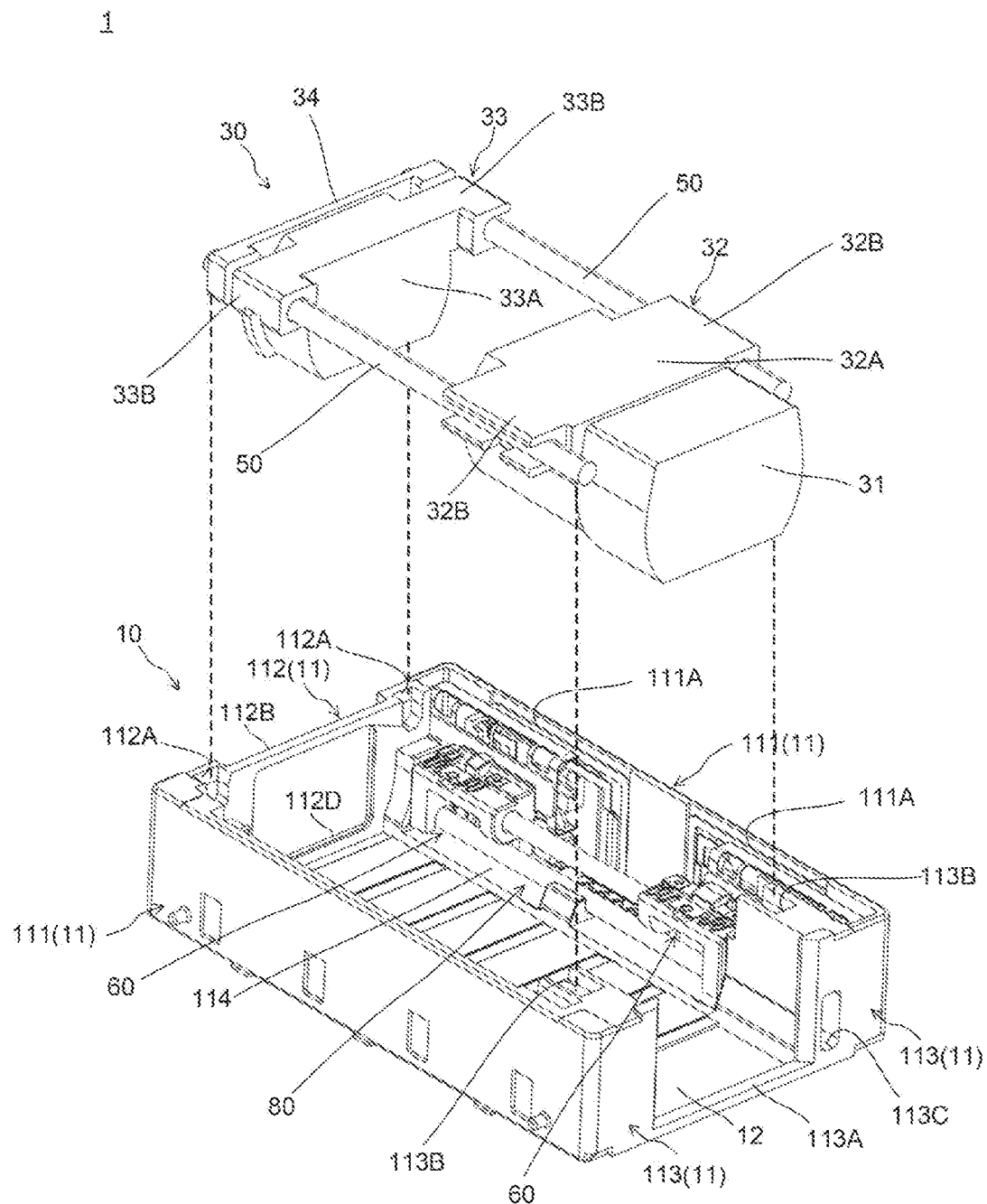
FIG. 5 is an exploded perspective view of a housing and a lens part.

As illustrated in FIGS. 3 and 5, third walls 113 are disposed respectively on the end portions of the pair of first walls 111 on the − side in the Y direction. The pair of third walls 113 are disposed to surround a space formed by first wall 111 and second wall 112. Between the pair of third walls 113, a gap large enough for first lens unit 31 of lens part 30 to enter there, and bridging portion 113A for bridging the end portions of respective third walls 113 on the − side in the Z-direction are disposed.

Further, supporting portions 113B for supporting support shafts 50 are formed in the top surfaces of the pair of third walls 113 (the surfaces on the + side in the Z direction). Guide supporting portion 113C for supporting guide shafts 81 and 82 to be described later is formed in the pair of third walls 113 near the central portion in the Z-direction.

Guide supporting portion 113C is a long hole configured to have a length in the Z direction corresponding to the placement range of two guide supporting portions 112C in second wall 112 described above. Guide supporting portion 113C is capable of supporting guide shafts 81 and 82 supported respectively by two guide supporting portions 112C in second wall 112.

As illustrated in FIG. 5, fourth walls 114 form bottom walls of the space formed by first walls 111, third walls 113 corresponding to first walls 111, and second wall 112, and are disposed in regions corresponding to third walls 113 in the X direction (see also FIG. 7). Therefore, a gap is formed between fourth walls 114 on both sides in the X direction.

Figure 6:
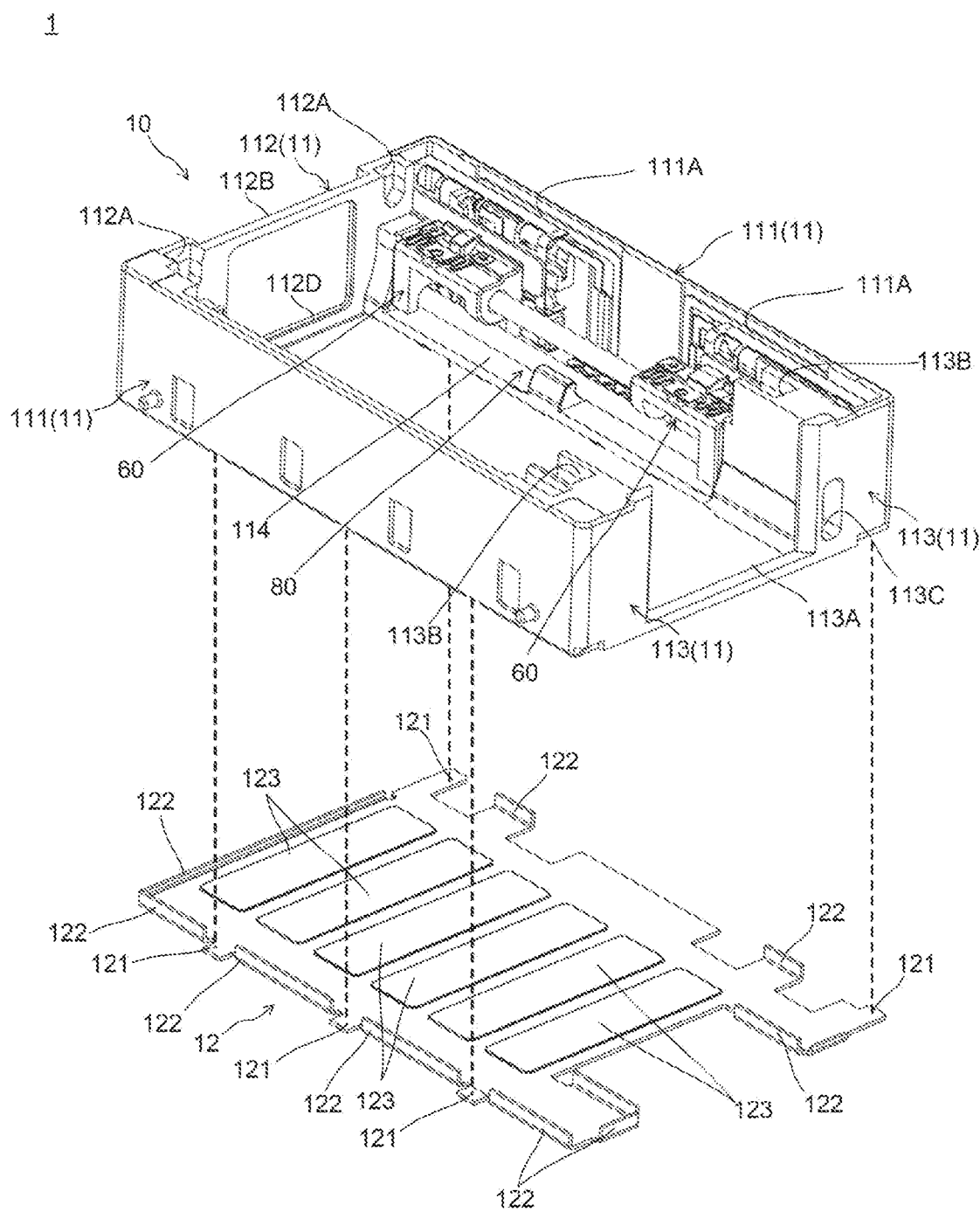
FIG. 6 is an exploded perspective view of a side wall portion and the bottom wall portion of the housing.

As illustrated in FIGS. 4 to 6, bottom wall portion 12 is, for example, a substantially rectangular metal plate forming the bottom wall of housing 10, and is disposed to bridge fourth walls 114 and the pair of first walls 111 on both sides in the X direction. Bottom wall portion 12 is integrated by insert molding with the bottom portions of side wall portions 11 including the bottom portions of the pair of first walls 111. Further, in order that there is not any portion of bottom wall portion 12 at a portion corresponding to first lens unit 31, an end portion of bottom wall portion 12 on the − side in the Y direction is cut out.

Positioning portions 121 are formed on the both lateral ends of bottom wall portion 12 in the X direction. Positioning portions 121 are formed to protrude from the both lateral ends of bottom wall portion 12, and are to be engaged with engaged portions 111B of first wall 111 described above. Thus, it is possible to position bottom wall portion 12 in the Y direction.

Further, as illustrated in FIG. 6, bent portions 122 are disposed on the lateral ends of bottom wall portion 12 in the X direction and Y direction. Bent portions 122 are formed by bending the lateral ends on the + side in the Z direction.

Further, grooves (not illustrated) in which bent portions 122 are fitted are formed in portions of housing 10 corresponding to bent portions 122. Bent portions 122 are fitted in the grooves, and accordingly, bottom wall portion 12 is fixed to housing 10.

Further, a plurality of half punches 123 disposed in the Y direction are formed in the surface of bottom wall portion 12. Half punches 123 are formed in bottom wall portion 12 over the X direction. In the present embodiment, a total of six half punches 123 are formed.

Such formation of half punches 123 can improve the strength of the bottom wall portion of housing 10.

As illustrated in FIGS. 3 and 5, lens part 30 is disposed in a region that is interposed between the pair of first walls 111 and that includes a region where reflected light L2 from reflection driving part 20 (see FIG. 2) passes. Lens part 30 includes first lens unit 31, second lens unit 32, third lens unit 33 and fourth lens unit 34 that are disposed side by side in the Y direction.

First lens unit 31 is disposed on the most upstream side in the incidence direction of reflected light L2 (direction toward the + side in the Y direction), and is fixed between the pair of third walls 113 in housing 10.

The side surfaces of first lens unit 31 are configured to be curved so as to be convex at central portions in the Z direction, for example. The side surfaces of third wall 113 on the first lens unit 31 side are shaped, for example, to conform the side surfaces of first lens unit 31, and are configured such that the curved portions of first lens unit 31 are fitted thereto. Thus, first lens unit 31 is fixed between the pair of third walls 113.

Second lens unit 32 is disposed on the downstream side of first lens unit 31 in the incidence direction, and includes main body portion 32A and supported portions 32B. Third lens unit 33 is disposed on the downstream side of second lens unit 32 in the incidence direction, and includes main body portion 33A and supported portions 33B. Second lens unit 32 corresponds to the "first movable part" of the present invention, and third lens unit 33 corresponds to the "second movable part" of the present invention.

Main body portions 32A and 33A hold a lens through which the light having passed through first lens unit 31 passes. Supported portions 32B and 33B are portions movably supported by support shafts 50 and are disposed on both sides of main body portions 32A and 33A in the X-direction.

The lens included in main body portion 32A of second lens unit 32 corresponds to the "first movable lens" of the present invention. The lens included in main body portion 33A of third lens unit 33 corresponds to the "second movable lens" of the present invention.

Fourth lens unit 34 is disposed on the most downstream side in the incidence direction, and is configured to include a lens. Fourth lens unit 34 is supported by support shafts 50 at a position adjacent to second wall 112 of housing 10. As illustrated in FIG. 4, in the present embodiment, protruding portion 34A is formed on the surface of fourth lens unit 34 on the + side in the Y-direction.

The lenses in first to fourth lens units 31 to 34 may be assembled to housing 10 when the lens driving device is manufactured, or may be assembled to housing 10 when camera module 1 is manufactured from the lens driving device.

Protruding portion 34A has a size making it possible to be fitted into opening portion 112D in second wall 112. By this protruding portion 34A fitted into opening portion 112D, fourth lens unit 34 is fixed to housing 10.

As illustrated in FIGS. 3 and 5, support shafts 50 are formed of, for example, stainless steel or the like. Support shafts 50 extend in the Y direction, and are disposed respectively in regions of the pair of third walls 113. In the present embodiment, support shafts 50 are formed to have equal lengths, and are supported by supporting portions 113B of third walls 113 and supporting portions 112A of second wall 112.

Lens driving parts 60 are disposed to correspond respectively to second lens unit 32 and third lens unit 33, and each of the lens driving parts moves corresponding one of second lens unit 32 and third lens unit 33 independently under the control of drive control part 100 described above. Lens driving parts 60 are disposed in the region of one of fourth walls 114 on the + side in the X direction surrounded by first wall 111, second wall 112, and third wall 113. That is, as illustrated in FIG. 7, lens driving parts 60 are disposed in housing 10 on one end side of opposite ends of second lens unit 32 and third lens unit 33 with respect to optical axis O.

In the present embodiment, two lens driving parts 60 are disposed side by side in the Y direction. One of lens driving parts 60 on the − side in the Y direction drives second lens unit 32 in the Y direction, and the other one of lens driving parts 60 on the + side in the Y direction drives third lens unit 33 in the Y direction. That is, lens driving part 60 on the − side in the Y direction corresponds to the "first driving part" of the present invention, and lens driving part 60 on the + side in the Y direction corresponds to the "second driving part" of the present invention.

Each of lens driving parts 60 has substantially the same configuration in the present embodiment. Thus, in the following description, unless otherwise stated, only lens driving part 60 corresponding to second lens unit 32 will be described, and lens driving part 60 corresponding to third lens unit 33 will not be described. Further, lens driving parts 60 are symmetrically disposed in the Y direction in the present embodiment. Thus, the relationship between the + side and the − side in the Y direction in lens driving part 60 corresponding to third lens unit 33 is reverse with respect to the relationship between the + side and the − side in the Y direction in lens driving part 60 corresponding to second lens unit 32.

Lens driving part 60 includes frame 61, connecting part 62, interposition part 63, ultrasonic motor 64, and guide part 80.

Frame 61 is connected via connecting part 62 to one of supported portions 32B and 33B of second lens unit 32 and third lens unit 33.

Frame 61 on the − side in the Y direction corresponds to the "first frame" of the present invention, and frame 61 on the + side in the Y direction corresponds to the "second frame" of the present invention.

Frame 61 is configured to be movable in the direction of optical axis O by guide part 80 guiding the movement in the direction of optical axis O (Y direction). Movement of frame 61 in the direction of optical axis O causes second lens unit 32 or third lens unit 33 connected to frame 61 via connecting part 62 to also move along support shafts 50.

Figure 8:
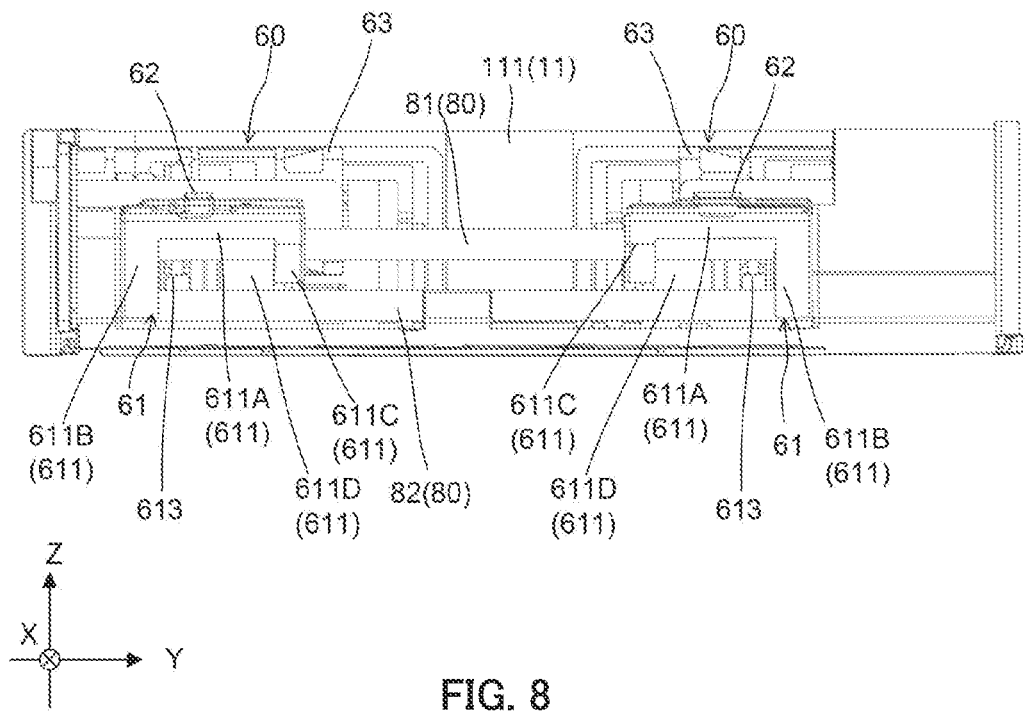
FIG. 8 illustrates the inside of the housing as seen from the − side in the X direction.
Figure 9:
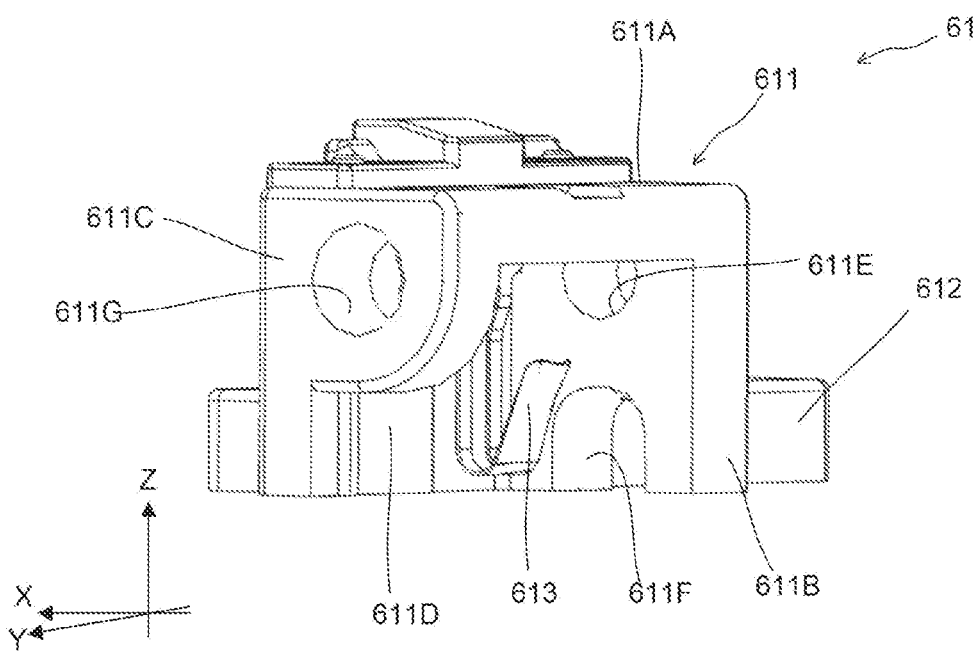
FIG. 9 is a diagram illustrating a guided portion.

As illustrated in FIGS. 8 and 9, frame 61 includes guided portion 611, and magnet holding portion 612. Guided portion 611 is a portion for guiding the movement of frame 61 by guide part 80 in the Y direction, and is disposed at a position corresponding to guide part 80 in the X direction. Guided portion 611 includes first portion 611A, second portion 611B, third portion 611C, and fourth portion 611D.

First portion 611A is a portion forming the top surface of frame 61 (surface on the + side in the Z direction), and is configured to extend in the direction of the optical axis (Y direction). First portion 611A is provided to cover guide part 80 from the + side in the Z-direction.

Figure 10:
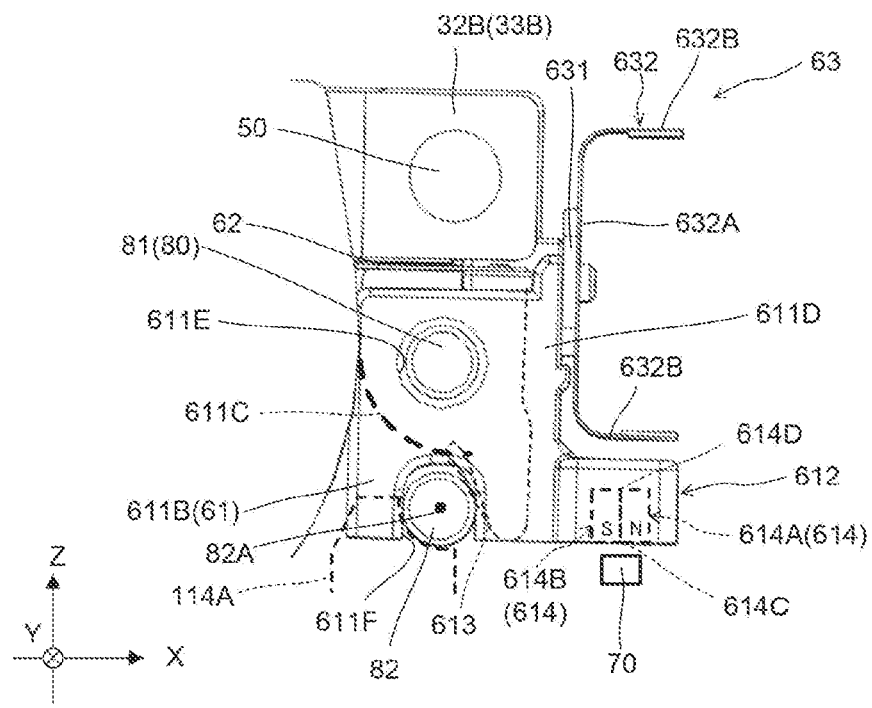
FIG. 10 is a diagram illustrating a connecting portion between the lens part and a frame.

Further, connecting part 62 is disposed on the surface on the + side of first portion 611A in the Z-direction. As illustrated in FIG. 10, connecting part 62 is a plate-shaped spring member (elastic member) fixed to the surface of frame 61 on the + side in the Z-direction and to the surface of any of supported portions 32B and 33B of second lens unit 32 and third lens unit 33 on the − side in the Y-direction. By connecting part 62 composed of the spring member, the elastic force of the spring member can absorb the deviation of the positional relationship even when manufacturing tolerances or the like cause the deviation in the positional relationship between frame 61 and supported portions 32B and 33B.

As illustrated in FIGS. 8 to 10, second portion 611B extends to the − side in the Z direction (a predetermined direction) from the end portion of first portion 611A on the − side in the Y direction (one end of first portion 611A), and supports first guide shaft 81 and second guide shaft 82.

Shaft hole 611E extending through in the Y-direction is formed in second portion 611B. Shaft hole 611E is formed at a position corresponding to first guide shaft 81 to be described later, and allows first guide shaft 81 to pass therethrough.

Shaft engaging portion 611F is formed in the end portion of second portion 611B on the − side in the Z-direction. Shaft engaging portion 611F is formed at a position where engagement with below-described second guide shaft 82 is possible, and is engaged with second guide shaft 82 from the + side in the Z direction.

Third portion 611C is a portion that extends to the − side in the Z direction from the end portion of first portion 611A on the + side in the Y direction (the other end of first portion 611A), and supports second guide shaft 82. More particularly, third portion 611C extends to a position such that the end portion on the − side in the Z-direction is spaced apart from second guide shaft 82 by a predetermined distance.

Shaft hole 611G extending through in the Y-direction is formed in third portion 611C. Shaft hole 611G is formed at a position corresponding to first guide shaft 81, and allows first guide shaft 81 to pass therethrough.

Fourth portion 611D is a portion extending from the end portion of first portion 611A on the + side in the X-direction. Fourth portion 611D is formed over entire first portion 611A in the Y direction, and is disposed to cover guide part 80 from the + side in the X direction.

Absorbing part 613 is disposed between fourth portion 611D and guide part 80 (second guide shaft 82). Absorbing part 613 is composed of a spring member and is disposed between fourth portion 611D and second guide shaft 82. Absorbing part 613 biases second guide shaft 82 to the − side in the X direction with respect to fourth portion 611D. As a result, absorbing part 613 absorbs a deviation in the positional relationship between frame 61 and guide part 80.

Figure 11:
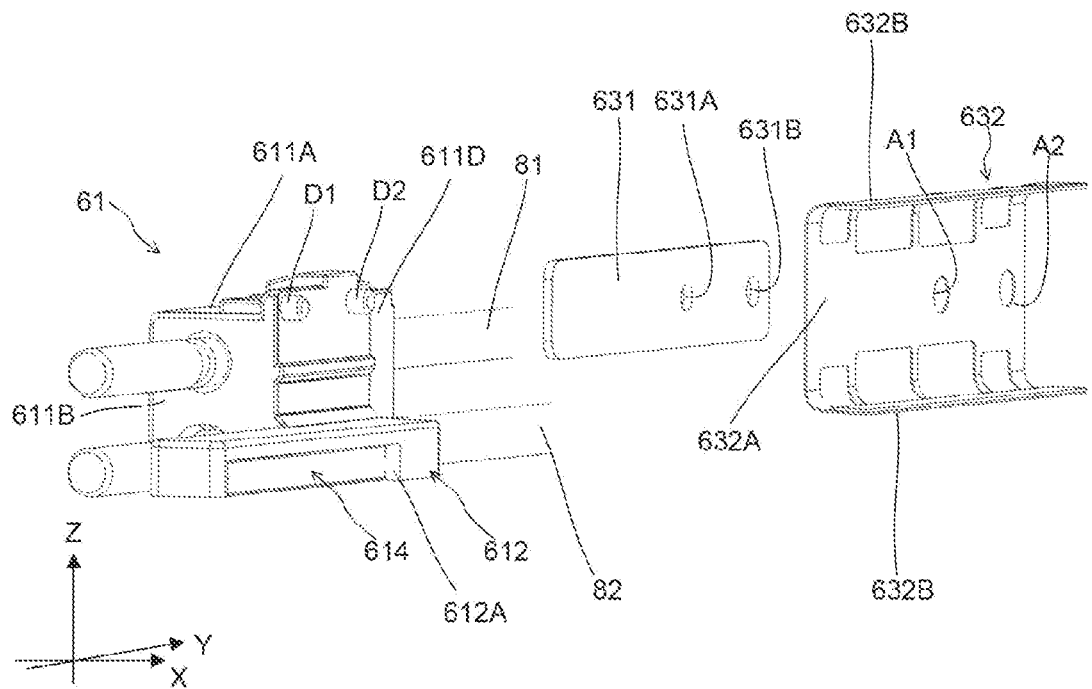
FIG. 11 is an exploded perspective view of the guided portion and an interposition part.

As illustrated in FIGS. 10 and 11, magnet holding portion 612 is a portion for holding magnet part 614 for position detection, and extends to the − side in the X direction from the end portion of fourth portion 611D on the − side in the Z direction.

Recessed portion 612A is formed in the end portion of magnet holding portion 612 on the − side in the Z-direction, and magnet part 614 is held in the recessed portion. Further, position detecting part 70 is disposed on a portion of housing 10 facing magnet part 614. Position detecting part 70 is a magnetoresistive element, and detects the position of frame 61 in the Y direction (the direction of the optical axis) by sensing a magnetic field in a plane including the X direction and the Y direction. Details of magnet part 614 and position detection by position detecting part 70 will be described later.

Further, as illustrated in FIGS. 10 and 11, interposition part 63 is disposed above magnet holding portion 612. Interposition part 63 includes first interposition member 631 and second interposition member 632.

First interposition member 631 is formed of, for example, a flat plate-shaped metallic member, and is bonded to the surface of fourth portion 611D of frame 61 on the + side in the X-direction. Two protrusions D1 and D2 are disposed on the surface of fourth portion 611D on the + side in the X-direction.

Two protrusions D1 and D2 project from the surface of fourth portion 611D and are disposed side by side in the Y-direction. In the present embodiment, protrusion D1 is disposed near the center portion of fourth portion 611D in the Y direction, and protrusion D2 is disposed near the end portion of fourth portion 611D on the + side in the Y direction.

First interposition member 631 is disposed parallel to the direction of the optical axis (Y direction), and includes engaging holes 631A and 631B for engagement with two protrusions D1 and D2.

Engaging hole 631A is disposed near the central portion of first interposition member 631 in the Y-direction, and is engaged with protrusion D1. Engaging hole 631A is formed in a size allowing engagement with protrusion D1, and allowing interposition part 63 (first interposition member 631) to rotate around engaging hole 631A with which protrusion D1 is engaged.

Engaging hole 631B is disposed near the end portion of first interposition member 631 on the + side in the Y direction, and is engaged with protrusion D2. Engaging hole 631B is formed in a size allowing engagement with protrusion D2, and such that the inner edge of engaging hole 631B is spaced from protrusion D2 by a distance allowing movement of the engaging hole with respect to protrusion D2 (see FIG. 12B).

Figure 12A:
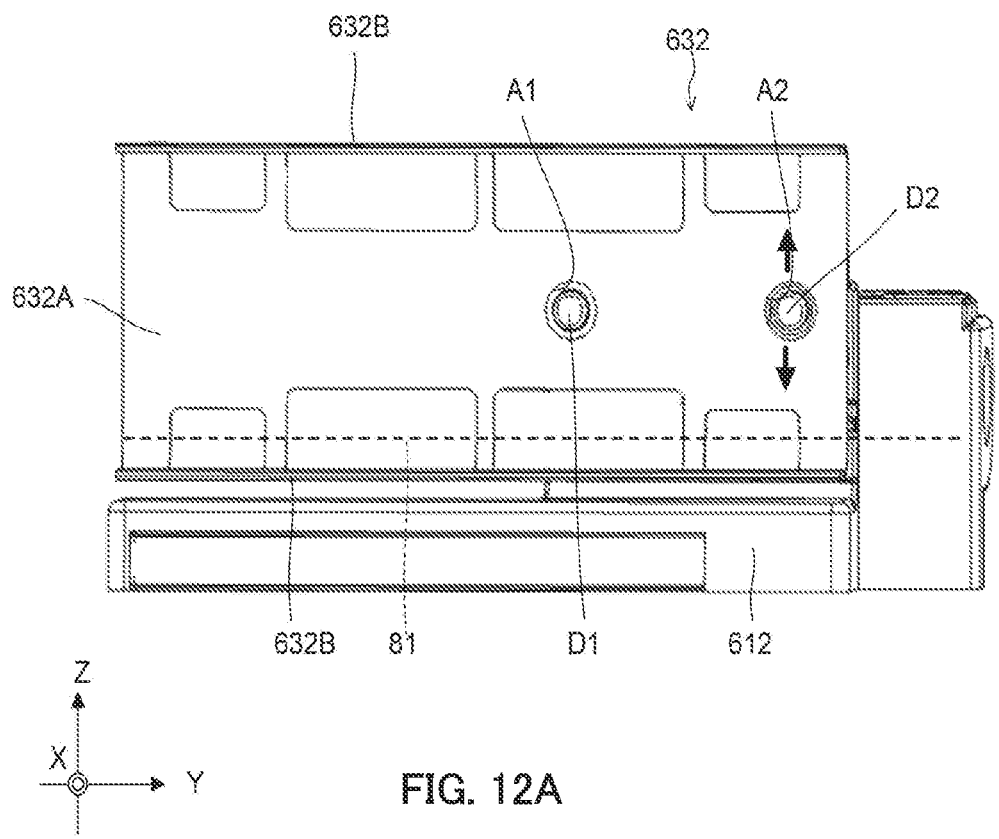
FIG. 12A is a diagram for explaining adjustment of the positional relationship between the interposition part and the guide shaft.
Figure 12B:
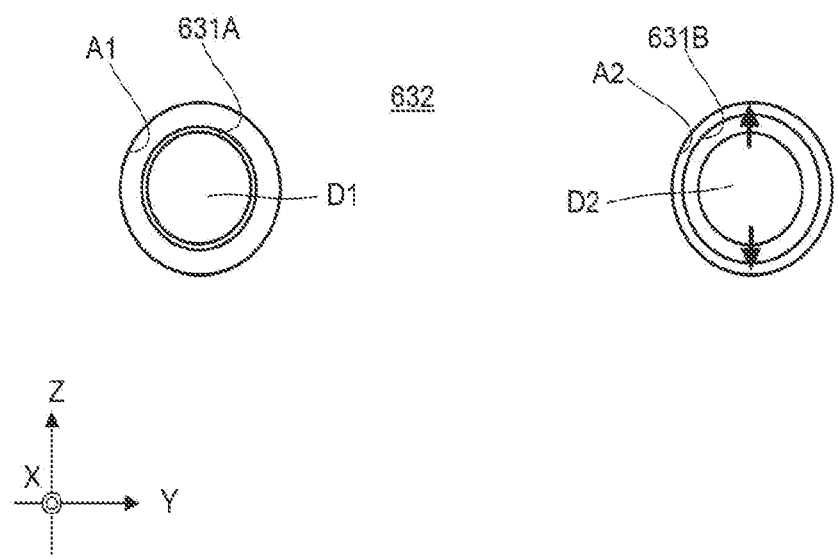
FIG. 12B is a diagram for explaining adjustment of the positional relationship between the interposition part and the guide shaft.

Engaging holes 631A and 631B thus formed make it possible to allow interposition part 63 to rotate around engaging hole 631A (protrusion D1) within the range of engaging hole 631B as illustrated in FIGS. 12A and 12B. As a result, the attitude of interposition part 63 can be adjusted so that contact portions 632B of interposition part 63 are parallel to the guide shaft.

As illustrated in FIG. 11, second interposition member 632 is formed of, for example, a plate-like metal member, and is adhesively fixed to, for example, first interposition member 631. Second interposition member 632 includes main body portion 632A and contact portions 632B.

Main body portion 632A is a portion that has a plane parallel to the direction of the optical axis (Y direction), and is adhesively fixed to first interposition member 631. Holes A1 and A2 through which two protrusions D1 and D2 of fourth portion 611D of frame 61 pass are formed in main body portion 632A.

Contact portions 632B are portions with which an oscillator of ultrasonic motor 64 makes contact, and are formed by bending the end portions of main body portion 632A on both sides in the Z-direction toward the side opposite to the lens part. Thus, main body portion 632A connecting together the pair of contact portions 632B is disposed to cover ultrasonic motor 64 from the − side in the X direction, and contact portions 632B are disposed to sandwich ultrasonic motor 64 (resonant portion 641).

Interposition part 63 thus configured generates a thrust in the direction of the optical axis (Y direction) in interposition part 63 by a force acting on contact portions 632B from the oscillator of ultrasonic motor 64. As a result, it is possible to impart a thrust from interposition part 63 to frame 61 for movement in the direction of the optical axis (Y direction).

Figure 13:
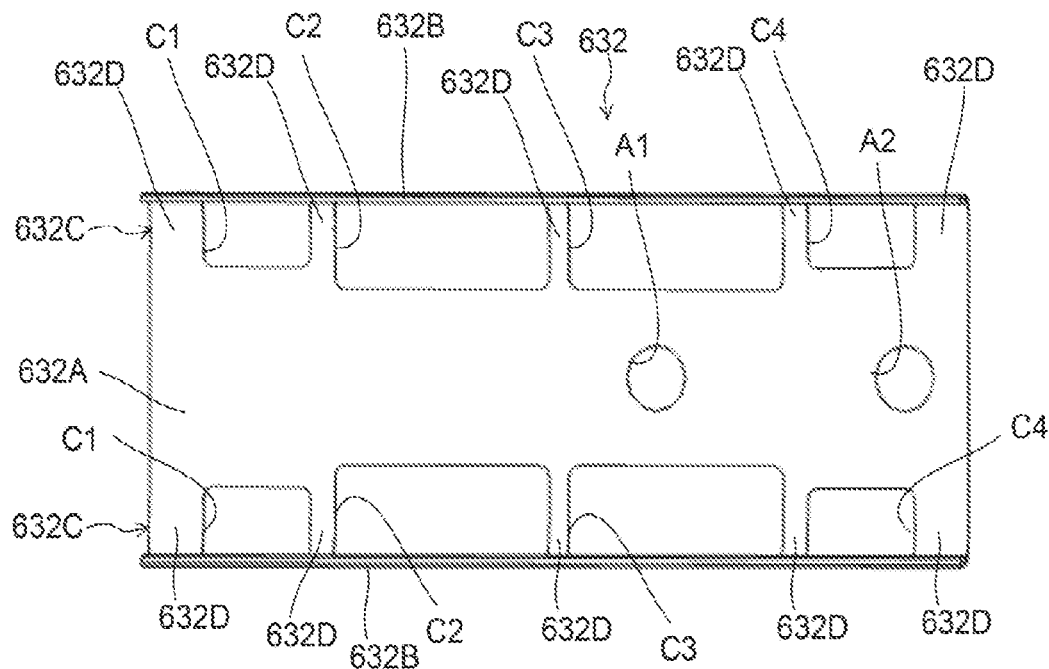
FIG. 13 is a diagram illustrating a second interposition member.
Figure 13:
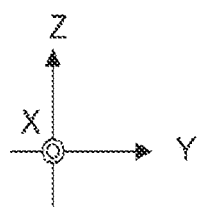

As illustrated in FIG. 13, a plurality of openings C1, C2, C3, and C4 are formed in connecting portions 632C between main body portion 632A and contact portions 632B. The plurality of openings C1, C2, C3, and C4 disposed side by side in the Y direction are four in number on each side of the connecting portions in the Y direction.

Of four openings C1, C2, C3, and C4, two openings C2 and C3 on the central side in the Y direction are configured to have lengths in the Y direction and in the Z direction that are longer than the lengths of two opening C1 and C4 on the both end sides.

Further, four openings C1, C2, C3, and C4 are formed, and thus, in connecting portions 632C, five connecting sections 632D disposed at intervals in the direction of the optical axis are formed.

The widths of connecting sections 632D in the Y direction (direction of the optical axis) increase in the order from the connecting section in the middle in the Y direction toward connecting section 632D located on the outer side in the present embodiment. Specifically, middle connecting section 632D in the Y-direction is the narrowest of five connecting sections 632D. Connecting sections 632D at both ends in the Y-direction are the widest of five connecting sections 632D. Connecting sections 632D located between middle connecting section 632D and connecting sections 632D at both ends are wider than middle connecting section 632D and narrower than connecting sections 632D at both ends.

The closer the connecting sections 632D is located to the end sides, the lower the strengths of connecting sections 632D (connecting portion 632C). Thus, in the present embodiment, the strengths of connecting portions 632C are adjusted by changing the sizes of openings C1, C2, C3, and C4 and the widths of connecting sections 632D in connecting portion 632C.

With the configuration as described above, it is possible to equalize the pressing force applied by oscillator 641B at each position of contact portion 632B in the entire Y-direction. As a result, in the device mounted in a portable terminal such as a smart phone, for example, the moving force by interposition part 63 can be stably generated during operation of the stepless optical zoom function even when the movable part is moved within a relatively long movement range.

Figure 14:
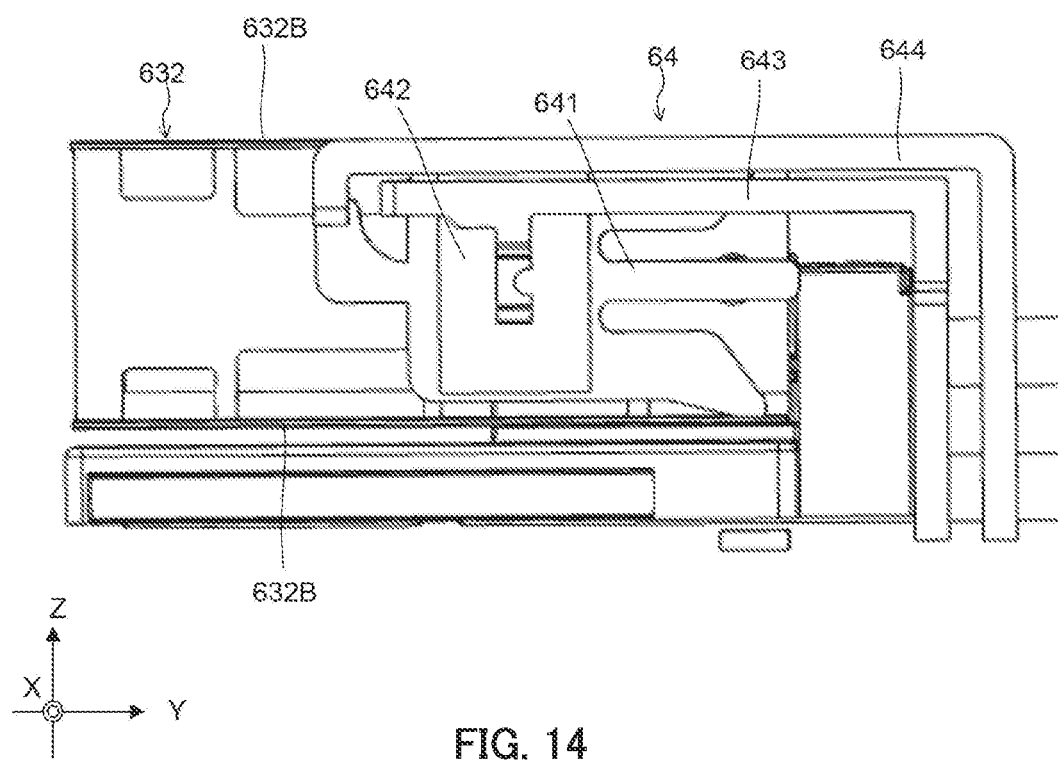
FIG. 14 is a diagram illustrating the arrangement relationship between the interposition part and an ultrasonic motor.
Figure 15:
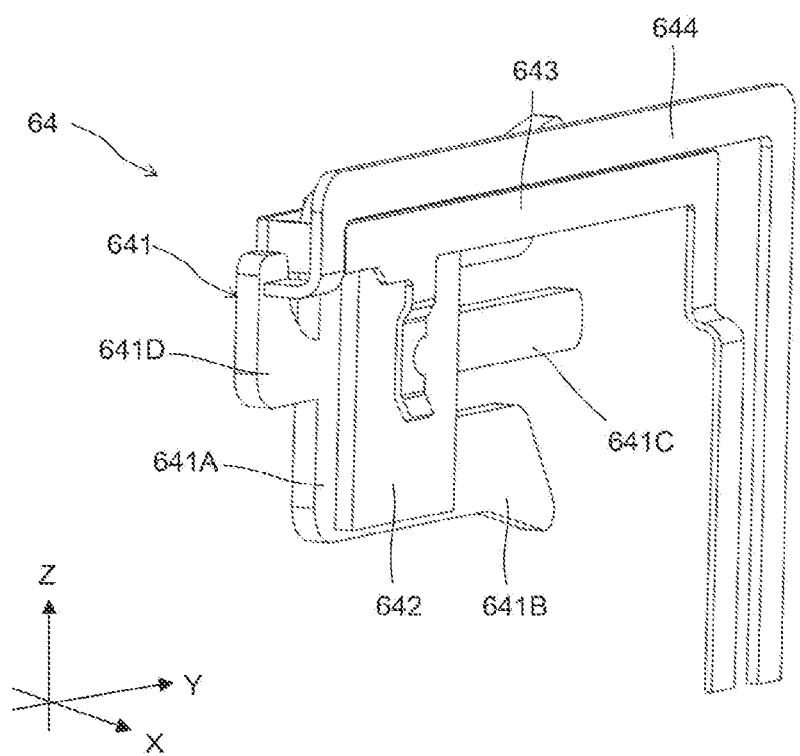
FIG. 15 is a perspective view of the ultrasonic motor.

As illustrated in FIGS. 14 and 15, ultrasonic motor 64 is a driving source for generating a driving force for moving frame 61, and is fixedly disposed on each of placement portions 111A of first wall 111 on the + side in the X direction (see FIG. 3 or the like). Ultrasonic motor 64 includes resonant portion 641, piezoelectric elements 642, first electrode 643, and second electrode 644.

One of ultrasonic motors 64 on the − side in the Y direction corresponds to the "first ultrasonic motor" of the present invention, and the other one of ultrasonic motors 64 on the + side in the Y direction corresponds to the "second ultrasonic motor" of the present invention.

Figure 16:
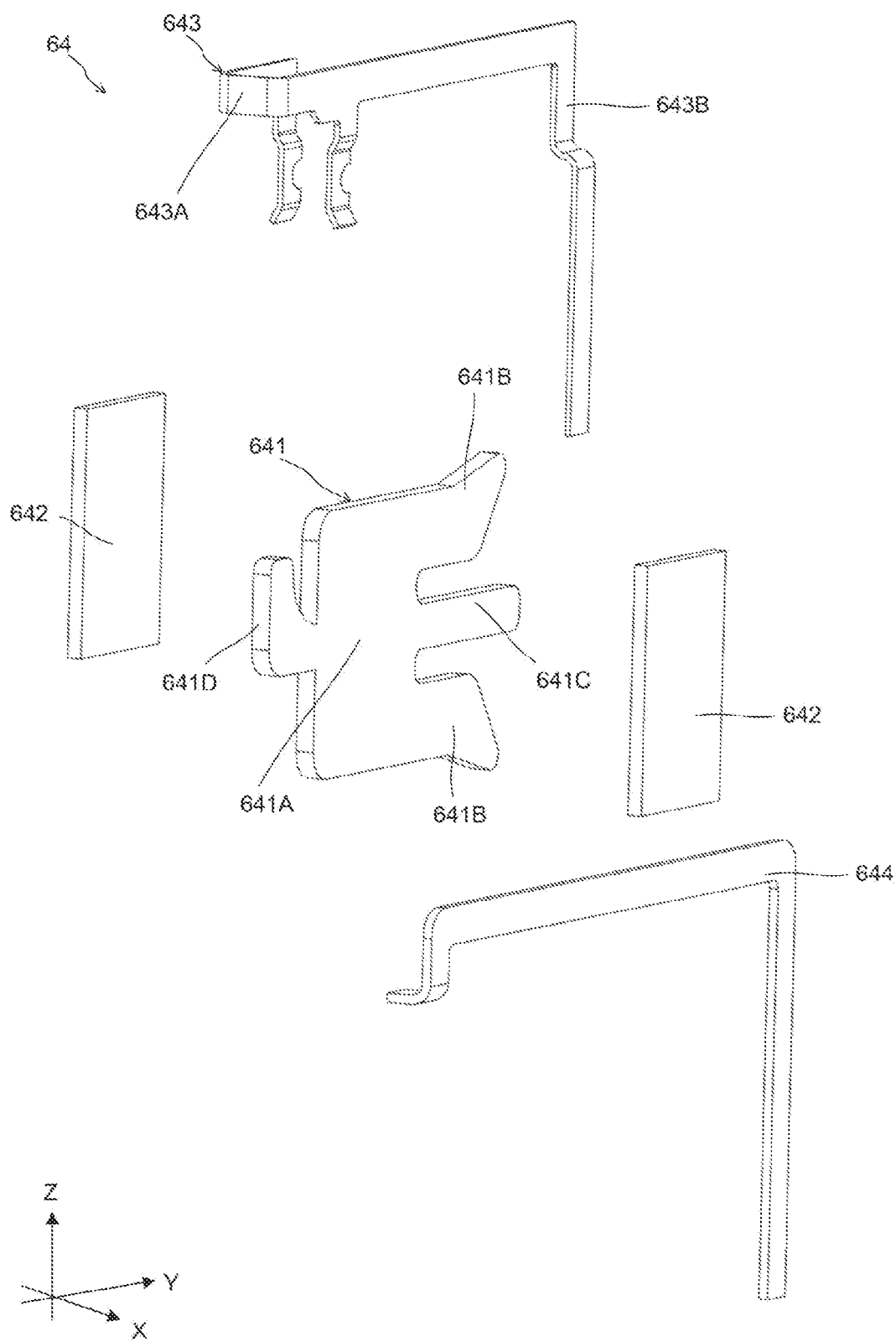
FIG. 16 is an exploded perspective view of the ultrasonic motor.

Resonant portion 641 is formed of, for example, a conductive material and resonates with the vibration of piezoelectric elements 642 to convert a vibrational motion into a linear motion of frame 61. Specifically, resonant portion 641 vibrates in an inclination direction inclined with respect to the direction of the optical axis (Y direction) based on the vibration of piezoelectric elements 642 so as to press interposition part 63. Accordingly, a thrust to move frame 61 via interposition part 63 in the direction of the optical axis is generated. Resonant portion 641 is disposed to be sandwiched between two contact portions 632B of interposition part 63. As illustrated in FIG. 16, resonant portion 641 includes body portion 641A, two oscillators 641B, protruding portion 641C, and energization portion 641D.

Body portion 641A is configured in a substantially rectangular shape, for example, and is a portion sandwiched between piezoelectric elements 642. Two oscillators 641B extend in the Y-direction from both end portions of body portion 641A in the Z-direction. Two oscillators 641B have symmetrical shapes, and their respective free end portions make contact with contact portions 632B of interposition part 63. Two oscillators 641B correspond to the "first oscillator" and the "second oscillator" of the present invention.

Protruding portion 641C extends to the + side in the Y direction from the central portion of body portion 641A in the Z direction. Energization portion 641D extends to the side opposite to protruding portion 641C (the − side in the Y direction) from the central portion of body portion 641A in the Z direction.

Each of piezoelectric elements 642 is, for example, a vibration element formed of a ceramic material in a plate shape, and generates vibration by application of a high-frequency voltage. Two piezoelectric elements 642 are disposed to sandwich body portion 641A of resonant portion 641 in the X-direction, respectively.

First electrode 643 includes clamping portion 643A for clamping resonant portion 641 and piezoelectric elements 642, and electrode portion 643B to which a voltage is applied. Via clamping portion 643A for clamping piezoelectric elements 642 and the like, first electrode 643 applies a voltage to piezoelectric elements 642. Second electrode 644 is electrically connected to energization portion 641D of resonant portion 641. First electrode 643 and second electrode 644 make contact with the terminal of terminal portion 111C described above inside housing 10.

Two piezoelectric elements 642 are bonded to body portion 641A of resonant portion 641 and are held in between by first electrode 643, so that these are electrically connected to one another. For example, one side of a power supply path is connected to first electrode 643, and the other side is connected to second electrode 644. A voltage is applied to piezoelectric elements 642, and a vibration is thus generated.

Resonant portion 641 has at least two resonant frequencies, and deforms in behaviors different between the resonant frequencies. In other words, the entire shape of resonant portion 641 is set such that resonant portion 641 deforms in behaviors different between the two resonant frequencies. The different behaviors mean behaviors of moving frame 61 to the + side and to the − side in the Y direction via interposition part 63.

Figure 17:
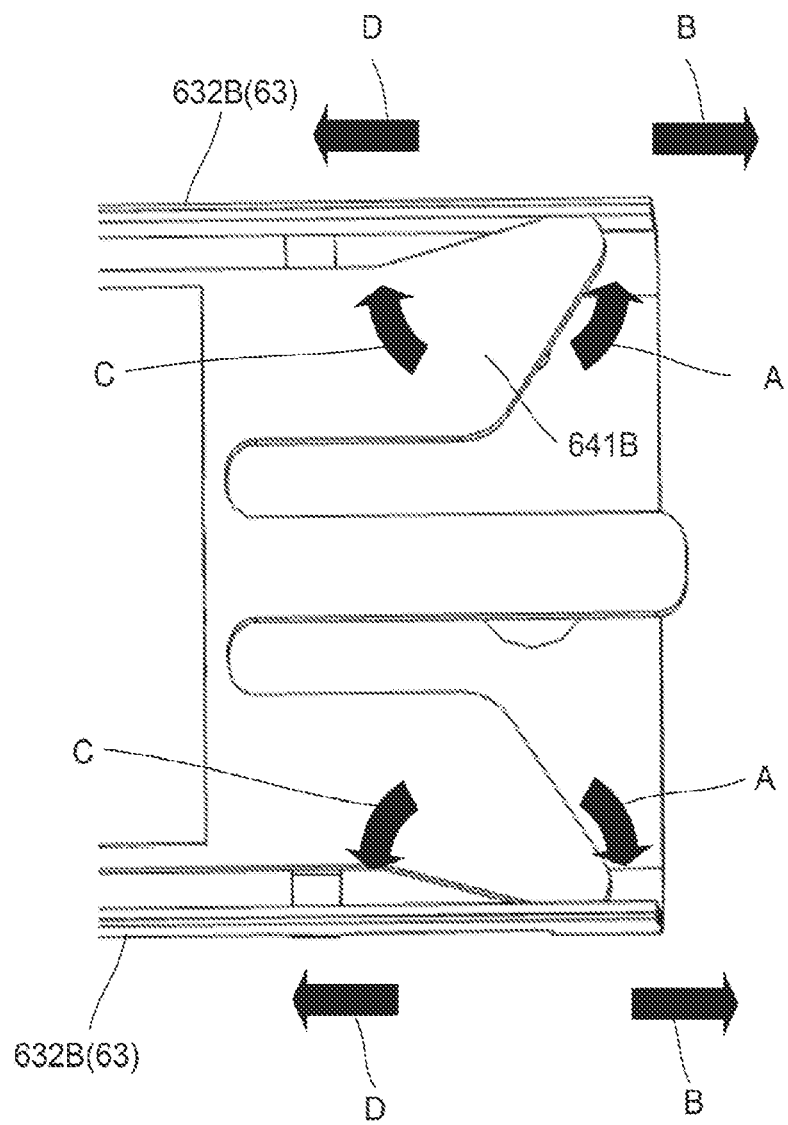
FIG. 17 is an enlarged view of a contact portion between a resonant portion and the interposition part.

As illustrated in FIG. 17, resonant portion 641 is disposed such that either of the pair of contact portions 632B of interposition part 63 and oscillators 641B face each other. Thus, when two oscillators 641B are deformed, the tip ends of oscillators 641B press (see arrows A) contact portions 632B in a direction inclined with respect to the Y direction from the opposing sides of contact portions 632B.

When contact portions 632B are pressed in the directions of arrows A by the tip ends of oscillators 641B, reaction forces of the contact portions returning on the oscillators 641B sides are generated at contact portions 632B. In other words, interposition part 63 generates a reaction force in a direction from the outside of the pair of contact portions 632B toward the inside based on the contact between oscillators 641B and the pair of contact portions 632B.

By the reaction force of interposition part 63 with respect to the press of oscillators 641B, the friction generated between oscillators 641B and contact portions 632B causes a thrust in the Y direction in interposition part 63. Accordingly, the thrust for movement in the Y direction is applied to frame 61 to be bonded to interposition part 63 (see arrow B). As a result, second lens unit 32 or third lens unit 33 connected to frame 61 is moved in the Y direction.

Further, contact portions 632B are configured to extend in the Y direction. When pressed against oscillators 641B, contact portions 632B move in the Y direction while making sliding contact with oscillators 641B. Therefore, contact portions 632B are continuously pressed by oscillators 641B. Thus, frame 61 to be bonded to interposition part 63 can be moved continuously in the Y-direction. Note that, at a certain resonant frequency, the pressing directions of oscillators 641B are the directions of arrows A and the sliding direction of contact portions 632B is the direction of arrows B, whereas at another resonance frequency, the pressing directions of oscillators 641B are the directions of arrows C and the sliding direction of contact portions 632B is the direction of arrows D.

Such driving operation is performed by each of ultrasonic motors 64 disposed on each of first walls 111 on both sides in the X direction. That is, ultrasonic motors 64 respectively drive second lens unit 32 and third lens unit 33 independently in the direction of the optical axis.

Figure 18:
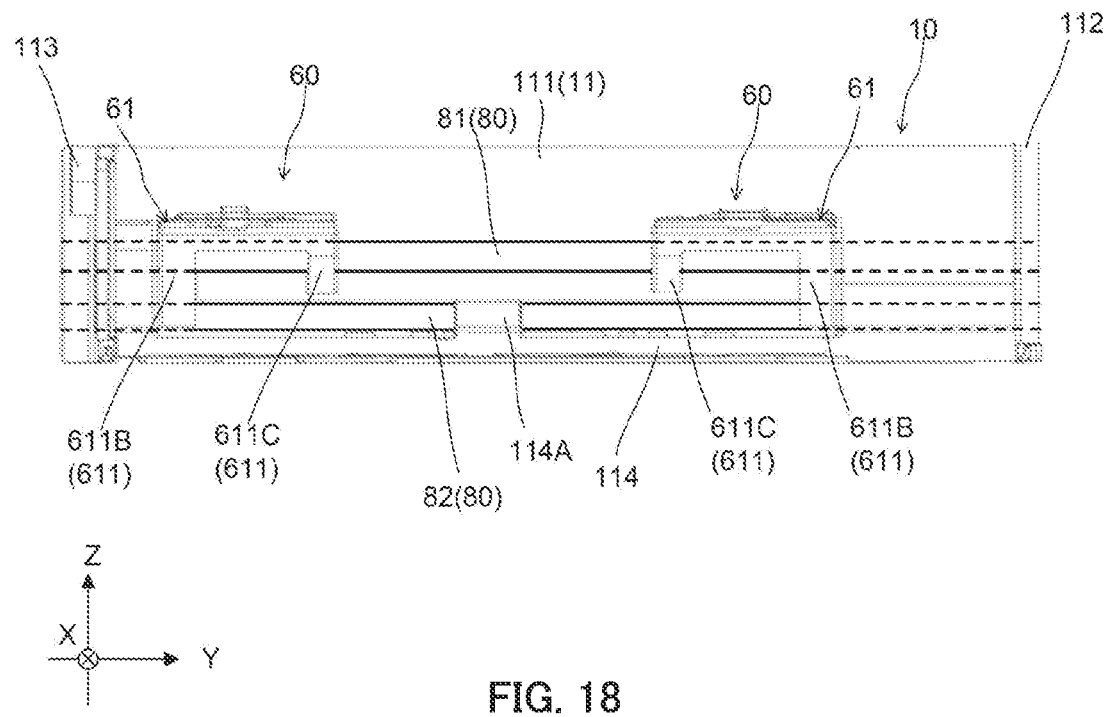
FIG. 18 is a diagram for explaining the configuration of the guide part.

As illustrated in FIG. 18, their movements are guided by guide part 80. Guide part 80 is disposed in the region of one of fourth walls 114 on the + side in the X direction that is surrounded by first wall 111, second wall 112, and third wall 113. That is, guide part 80 is disposed in housing 10 on one end side of opposite ends of second lens unit 32 and third lens unit 33 with respect to optical axis O (see also FIG. 7).

Guide part 80 includes first guide shaft 81 and second guide shaft 82, both of which extend in the direction of the optical axis (Y direction). The first and the second guide shafts are disposed to be spaced apart from each other and cooperate to support both of two frames 61 such that the frames are movable in the direction of the optical axis. First guide shaft 81 and second guide shaft 82 are formed from, for example, stainless steel or the like, and are supported by guide supporting portions (not illustrated) of second wall 112 and third wall 113 of housing 10 at both ends in the optical axis (both ends in the X direction). Second wall 112 and third wall 113 correspond to a "pair of walls" extending from the bottom wall (fourth wall 114) of the present invention.

First guide shaft 81 is a guide shaft for guiding the movement of each of frames 61 by supporting second portion 611B and third portion 611C of guided portion 611 of frame 61.

Second guide shaft 82 is a guide shaft disposed parallel to first guide shaft 81 on the – side (fourth wall 114 side) of first guide shaft 81 in the Z direction, and for guiding the movement of frame 61 by supporting (being engaged with) second portion 611B of guided portion 611 of frame 61. In addition, first guide shaft 81 and second guide shaft 82 are disposed at substantially the same position in the X direction as one of above-described support shafts 50, as illustrated in FIG. 10. As is understood, the two guide shafts, first guide shaft 81 and second guide shaft 82, are disposed for guiding the movement of lens driving parts 60. It is thus possible to improve the strength of housing 10.

Second guide shaft 82 is supported by bearing portion 114A disposed on fourth wall 114. Bearing portion 114A is disposed between two frames 61 to protrude from fourth wall 114 to the + side in the Z direction, and is disposed in the vicinity of the central portion of second guide shaft 82 in the Y direction. Second guide shaft 82 is adhesively fixed to bearing portion 114A. Further, bearing portion 114A is disposed in a range including center 82A of second guide shaft 82 in the X direction (direction between opposite ends with respect to the optical axis) (see FIG. 10).

Figure 19:
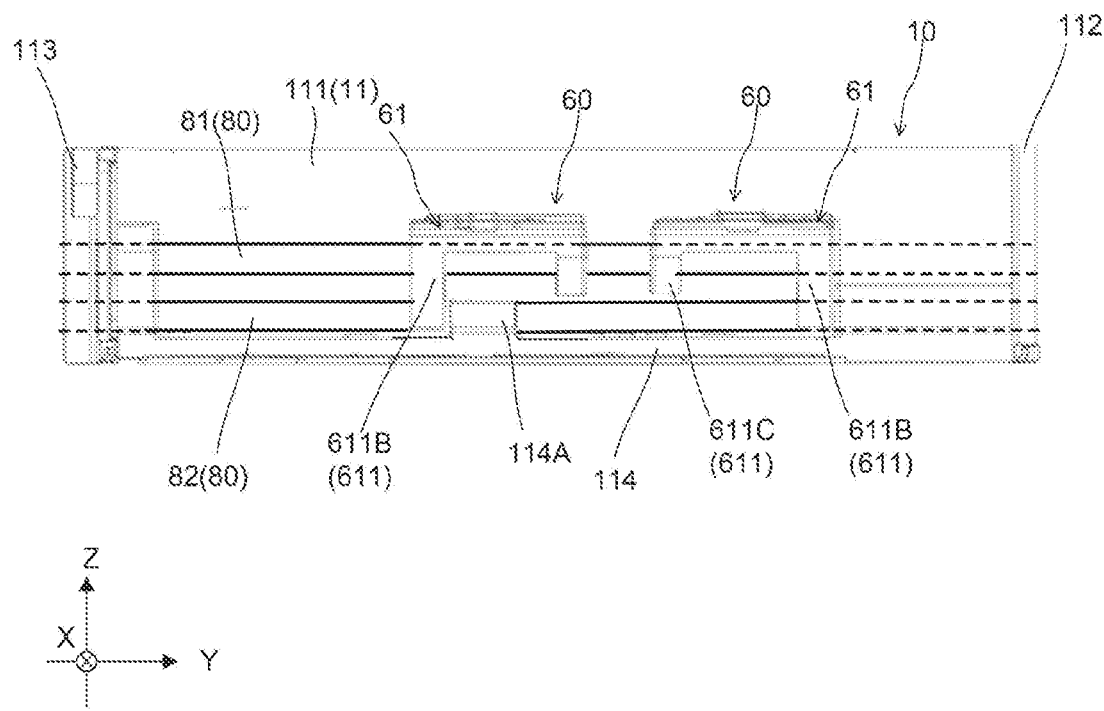
FIG. 19 is a diagram for explaining the configuration of the guide part.

Further, bearing portion 114A is disposed at a position where contact with second portion 611B of frame 61 is possible. Therefore, when frame 61 is moved to the + side in the Y direction, second portion 611B and bearing portion 114A of frame 61 make contact with each other (see FIG. 19). Thus, bearing portion 114A restricts the movement of frame 61.

Next, magnet part 614 will be described in detail.

Figure 20:
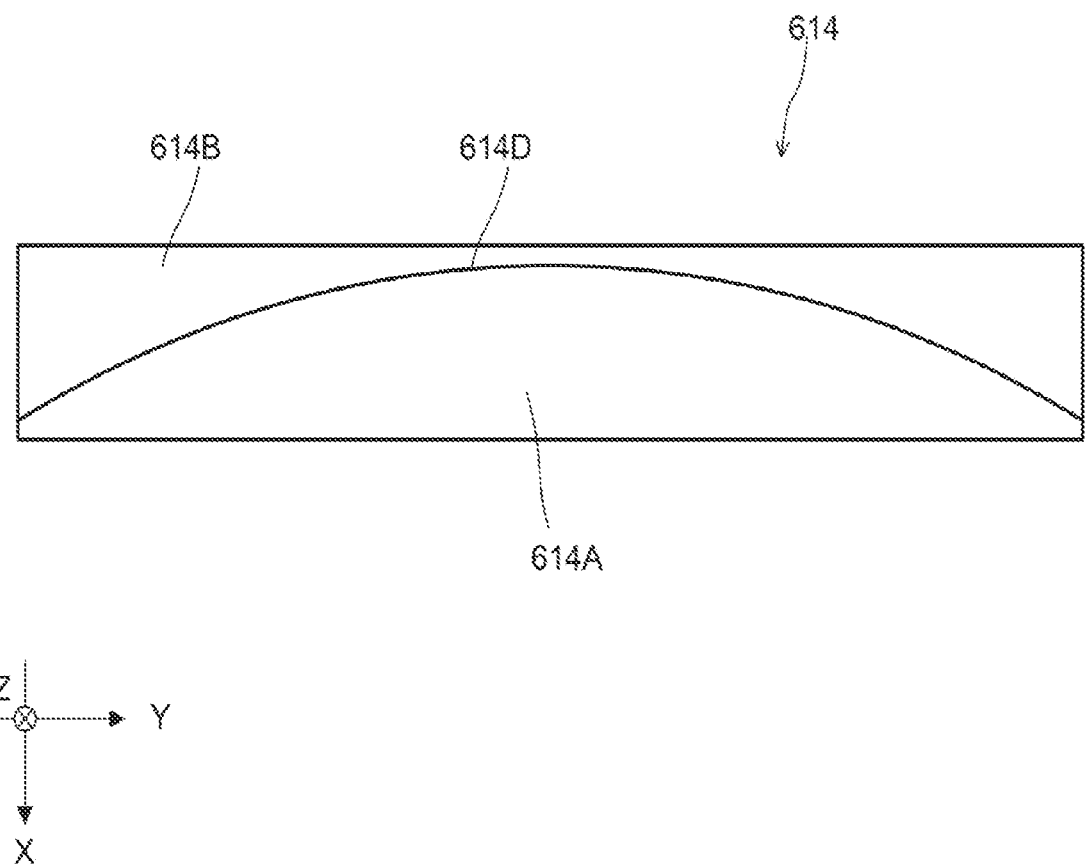
FIG. 20 illustrates a configuration of a magnet part.

As illustrated in FIG. 20, magnet part 614 includes first pole 614A and second pole 614B that are disposed adjacently to each other via border 614D in the X direction (a width direction perpendicular to the Y direction). First pole 614A is the N pole magnet and second pole 614B is the S pole magnet. That is, first pole 614A and second pole 614B are magnetized in a direction along a direction (Z direction in the present embodiment) in which magnet part 614 faces position detecting part 70, and such that the different poles face position detecting part 70.

First pole 614A and second pole 614B are disposed to be in contact with each other. Therefore, the N pole and the S pole are disposed adjacently to each other at opposing surface 614C of magnet part 614 facing position detecting part 70.

Magnet part 614 has a rectangular shape in which opposing surface 614C facing position detecting part 70 extends in the Y-direction in a state in which first pole 614A and second pole 614B are in contact with each other. That is, magnet part 614 extends linearly along the Y direction, having a constant width.

The adjacent surface of first pole 614A adjacent to second pole 614B is formed in an arc shape such that a central portion of the adjacent surface in the Y direction protrudes toward second pole 614B beyond the opposite end portions of the adjacent surface in the Y direction.

The adjacent surface of second pole 614B adjacent to first pole 614A is configured such that a center portion of the adjacent surface in the Y direction is recessed with respect to the opposite end portions of the adjacent surface in the Y direction so as to conform to the shape of the adjacent surface of first pole 614A.

That is, border 614D between first pole 614A and second pole 614B extends in a curved manner (to curve in an arc shape) such that the angle formed between border 614D and the Y-direction changes continuously. Specifically, border 614D extends in a curved manner so as to be displaced from the side of first pole 614A toward the side of second pole 614B in the X-direction along a course from the end portion of magnet part 614 on the – side in the Y-direction to a predetermined position, and displaced from the side of second pole 614B toward the side of first pole 614A in the X-direction along a course from the predetermined position to the end portion of magnet part 614 on the + side in the Y-direction. Thus, the ratio of the width of first pole 614A to the width of second pole 614B changes because of border 614D extending in a curved manner. More specifically, the proportion of first pole 614A between first pole 614A and second pole 614B increases in the Y direction from the end portion of magnet part 614 on the – side in the Y direction toward the predetermined position. The proportion of first pole 614A decreases from the predetermined position to the end portion of magnet part 614 on the + side in the Y-direction.

The predetermined position is, for example, the center position of magnet part 614 in the Y direction. In addition, the positions of the opposite end portions of first pole 614A and second pole 614B that are opposite to each other in the Y direction are the same positions in the X direction.

That is, first pole 614A and second pole 614B are symmetrically formed between the + side and the – side in the Y-direction.

With this configuration, the distribution of the magnetic force of magnet part 614 can be made symmetrical between the + side and the – side with respect to the central portion in the Y direction. Thus, the magnetic flux density of magnet part 614 detected by position detecting part 70 can be made different depending on the position of frame 61 (for example, see FIG. 22). In other words, border 614D between first pole 614A and second pole 614B extends in a curved manner to form a magnetic field in which the direction of the magnetic flux at the portion of magnet part 614 facing position detecting part 70 changes with movement of magnet part 614.

Next, position detection by position detecting part 70 will be described.

Figure 21A:
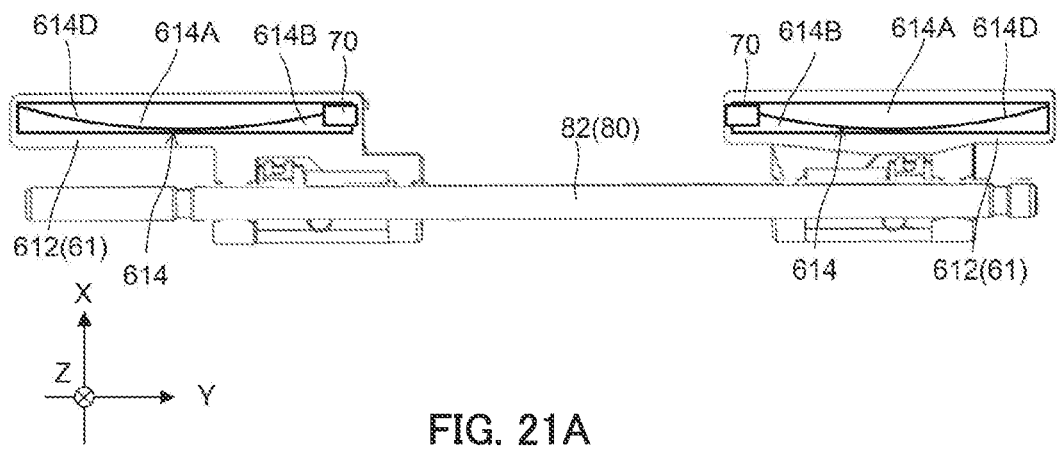
FIG. 21A is a diagram for explaining the positional relationship between the magnet and the position detecting part.
Figure 21B:
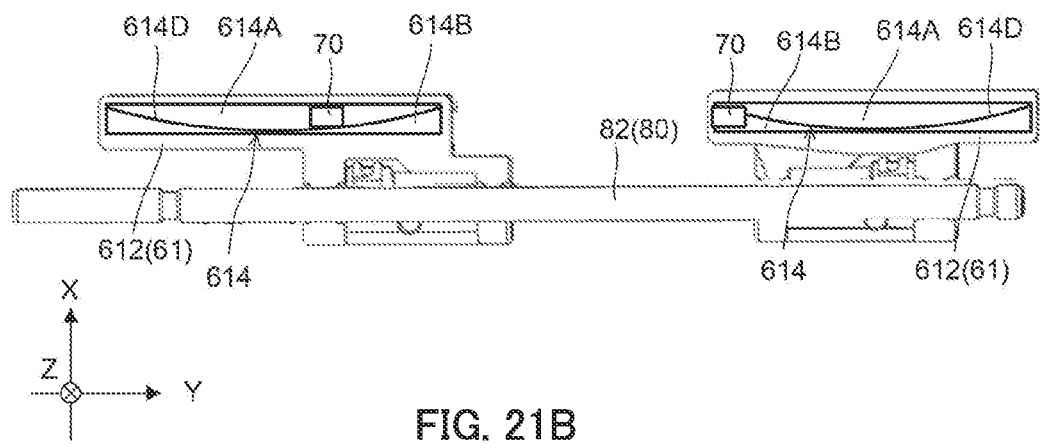
FIG. 21B is a diagram for explaining the positional relationship between the magnet and the position detecting part.
Figure 21C:
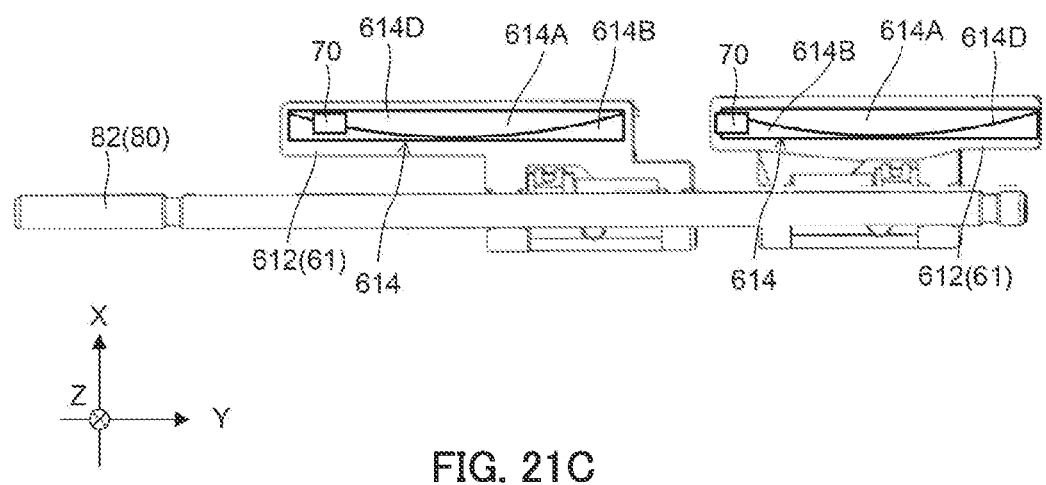
FIG. 21C is a diagram for explaining the positional relationship between the magnet and the position detecting part.

As illustrated in FIGS. 21A, 21B, and 21C, position detecting part 70 is capable of detecting a variation in the magnetic field (magnetic flux density) depending on the proportion of the N pole and the proportion of the S pole at the portion of magnet part 614 facing the position detecting part that is caused by the movement of frame 61 in the Y-direction.

For example, as illustrated in FIG. 21A, when the position of frame 61 is at the end on the − side position in the Y direction, position detecting part 70 faces the end portion of magnet part 614 on the + side in the Y direction. Position detecting part 70 faces a portion of the end portion where the proportion of first magnet 614A being the N pole is large.

As illustrated in FIG. 21B, when frame 61 is moved to the + side in the Y direction, magnet part 614 also moves with frame 61. Accordingly, the opposing portion of position detecting part 70 with respect to magnet part 614 changes. The proportion of first pole 614A increases as magnet part 614 moves toward the center position in the Y-direction. Correspondingly, the proportion of first pole 614A at the portion of magnet part 614 facing position detecting part 70 gradually increases.

When frame 61 is moved to a position where position detecting part 70 faces the center portion of frame 61, a portion at which the proportion of first pole 614A (N pole) is maximized is the portion facing position detecting part 70.

Then, as illustrated in 21C, when frame 61 is moved from the position where position detecting part 70 faces the center portion of frame 61 to a position where position detecting part 70 faces the end portion of magnet part 614 on the − side in the Y-direction, the proportion of first pole 614A at a portion of magnet part 614 facing position detecting part 70 decreases, while the proportion of second pole 614B increases.

Position detecting part 70 detects the magnetic flux density for each position of magnet part 614 in the Y direction. The change in the magnetic flux density detected by position detecting part 70 at this time is, for example, a change as illustrated in FIG. 22.

Specifically, as frame 61 moves toward the + side in the Y direction, the magnetic flux density rapidly increases from B1 on the − side with respect to 0 to B2 on the + side with respect to 0, and then gradually decreases to B3 on the − side with respect to 0. Then, the magnetic flux density rapidly increases from B3 to B4 on the + side with respect to 0.

For example, by setting, for each position in the Y direction, a value of the magnetic flux density in the range where the inclination is substantially constant, as in the range of from B2 to B3, it is possible to assign the magnetic flux density corresponding to each position in the Y direction of frame 61 at substantially equal intervals. As a result, it is possible to accurately detect a change in the position in the Y direction of frame 61 (magnet part 614) in the Y direction.

That is, in the present embodiment, the magnetic flux density detected by position detecting part 70 can be different between the positions of frame 61. It is thus possible to accurately detect the position of frame 61 in the Y direction by position detecting part 70.

Further, since position detecting part 70 is a magnetoresistive element, it is possible to detect the magnetic force in the horizontal direction (X direction and Y direction) in magnet part 614. For example, when the position detecting part is a Hall element, the magnetic force in the vertical direction (Z direction) in the magnet part is detected. Therefore, for example, when the position of the magnet part is displaced in the X direction due to an assembly error, there is a possibility that the magnet part is displaced out of the detection range of the position detecting part and the magnetic force cannot be detected. Thus, there is a possibility that accurate position detection of the frame (movable lens) cannot be performed.

In contrast, in the present embodiment, position detecting part 70 is a magnetoresistive element. Thus, the detection range of the magnetic force in the horizontal direction can be extended as compared with the position detecting part of the Hall element. As a result, even if the position of magnet part 614 is shifted in the X direction due to an assembly error, the magnetic force in magnet part 614 can be detected, and thus the accurate position detection of frame 61 (movable lens) can be performed.

Further, since first pole 614A and second pole 614B of magnet part 614 are symmetrical between the + side and the − side in the Y-direction, the distribution of the magnetic forces can be made symmetrical accordingly. Thus, the inclination of the change in the magnetic flux density in position detecting part 70 can be made substantially constant (for example, between B2 and B3 in FIG. 22). Accordingly, the change in the magnetic flux density at each position in the Y direction can be made substantially constant. As a result, since the magnetic flux density can be assigned for each position in the Y direction at equal intervals, the position of frame 61 (movable lens) in the Y direction can be accurately detected by position detecting part 70.

In the above embodiment, the adjacent surfaces of first pole 614A and second pole 614B are formed in an arc shape, but the present invention is not limited to this. For example, as illustrated in FIG. 23, the adjacent surfaces of first pole 614A and second pole 614B may be formed in a triangular shape.

Figure 24:
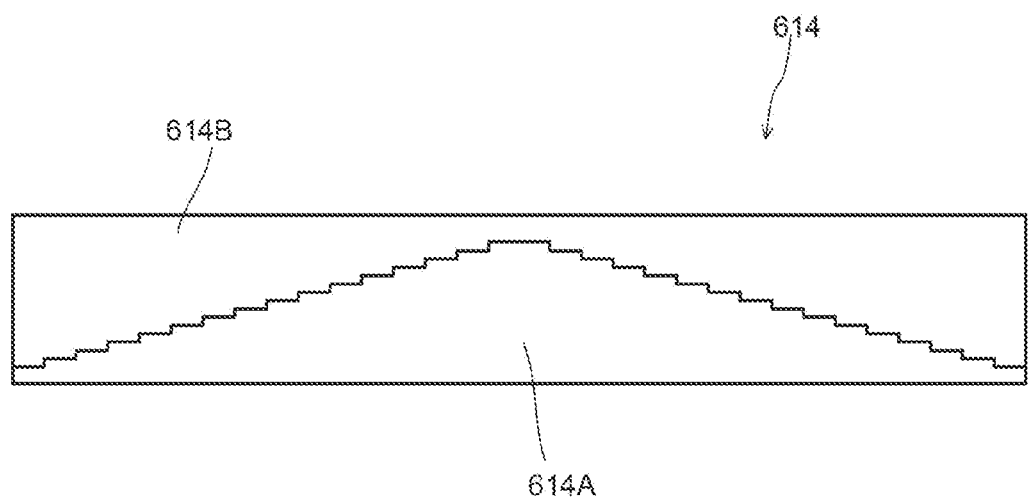
FIG. 24 is a diagram illustrating a configuration of a magnet part according to another modification.

Further, as illustrated in FIG. 24, the adjacent surfaces of first pole 614A and second pole 614B may be formed in a stepped shape.

Further, in the above embodiment, first pole 614A and second pole 614B are symmetrical between the opposite sides in the Y direction, but the present invention is not limited to this. For example, as illustrated in FIG. 25, first pole 614A and second pole 614B do not have to be symmetrical between the opposite sides in the Y direction.

Figure 25:
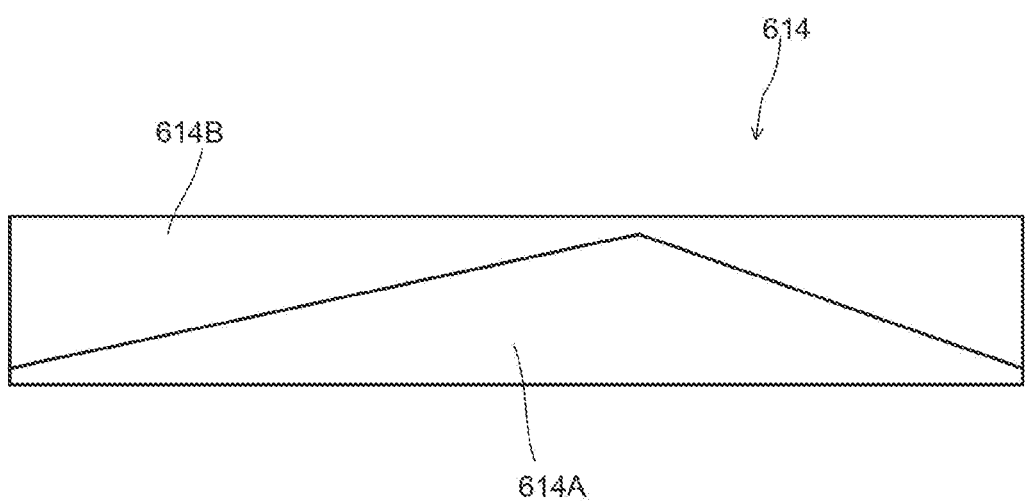
FIG. 25 is a diagram illustrating the configuration of the magnet part according to still another modification.
Figure 26:
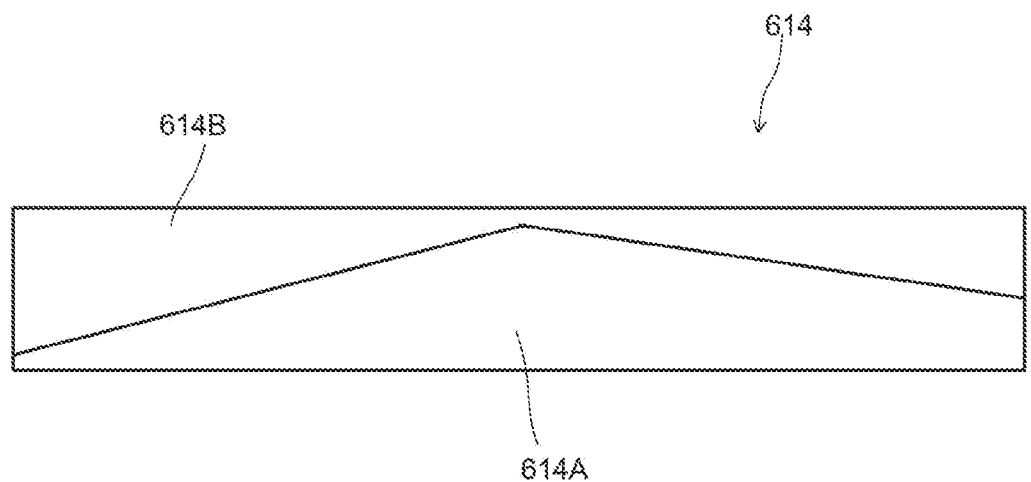
FIG. 26 is a diagram illustrating the configuration of the magnet part according to even another modification.

FIG. 25 illustrates triangular adjacent surfaces of first pole 614A and second pole 614B. The apex position (predetermined position) in the adjacent surface of first pole 614A is a position shifted to the + side in the Y direction from the center portion of magnet part 614 in the Y direction. Further, as illustrated in FIG. 26, the apex position (predetermined position) in the adjacent surface of first pole 614A may be at the center portion in the Y direction and the X-direction positions of the opposite ends of the adjacent surface of first pole 614A in the Y direction may be different from each other.

In the above-described embodiment, position detecting part 70 detects the magnetic flux density of magnet part 614, but the present invention is not limited to this. For example, position detecting part 70 may detect the rotational angle of magnet part 614 around the Z direction.

Figure 27:
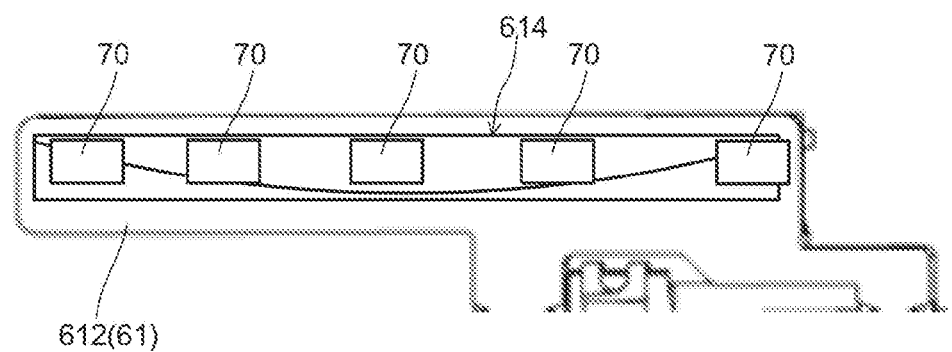
FIG. 27 is a diagram illustrating a configuration having a plurality of position detecting parts.

Further, in the above-described embodiment, one position detecting part 70 is disposed on each frame 61, but the present invention is not limited thereto. For example, as illustrated in FIG. 27, a configuration may be employed which includes a plurality of position detecting parts 70 disposed side by side in the direction of the optical axis (Y direction). With such a configuration, it is possible to further improve the accuracy of the position detection for frame 61.

Further, in the above embodiment, position detecting part 70 is a magnetoresistive element, the present invention is not limited to this. Any type of position detecting part may be used as long as it is possible to sense the magnetic field in the plane including the X direction and the Y direction.

Further, in the above embodiment, a configuration having two guide shafts is employed, but the present invention is not limited thereto. The present invention may have a configuration having, for example, three or more guide shafts. The present invention may also have a configuration having a single guide shaft.

In the above embodiment, support shafts 50 are disposed on both sides in the X direction, but the present invention is not limited to this, and support shaft 50 may be disposed on only one side in the X direction.

In the above embodiment, side wall portion 11 and bottom wall portion 12 of housing 10 are formed by insert molding. However, the present invention is not limited to this, and the bottom wall portion may be adhesively fixed to side wall portion 11.

Further, the above embodiment employs the configuration having two movable lenses composed of second lens unit 32 and third lens unit 33, but the present invention is not limited to this, and the configuration may have a single movable lens, or three or more movable lenses.

Further, the above embodiment employs the configuration having four lens units, but the present invention is not limited to this, and any number of lens units may be provided as long as the configuration has at least one movable lenses. In addition, in the case of a configuration including one movable lens, the number of lens driving parts is also one.

In the above embodiment, interposition part 63 is formed by bending a plate-like metal member, but the present invention is not limited to this, and the main body portion and the contact portion forming the interposition part may be formed by separate members.

In the above embodiment, frame 61 and interposition part 63 are formed of separate members, but the present invention is not limited thereto. For example, frame 61 and interposition part 63 may be integrally formed. That is, the lens driving part may include a moving portion that moves in the direction of the optical axis in accordance with resonance of the resonant portion and is connected to each of the lens units so as to transmit the movement in the direction of the optical axis.

In the above embodiment, each of connecting parts 62 connecting together frame 61 and the lens unit includes the spring member, but the present invention is not limited to this, and any member may be included as long as it is a member having elasticity.

Further, in the above embodiment, third portion 611C of frame 61 is disposed to be spaced apart from second guide shaft 82, but the present invention is not limited to this, and a configuration may also be used in which the third portion may also support the second guide shaft.

The above embodiment has the configuration in which the bottom wall portion includes the bent portions or half punches, but the present invention is not limited to this, and a configuration may also be used in which the bottom wall portion does not includes any bent portion or half punch.

In the above embodiment, resonant portion 641 includes two oscillators 641B, but the present invention is not limited to this, and the present invention may have a configuration in which the resonant portion includes one oscillator, for example.

In the above embodiment, the drive control part, the reflection drive control part, and the image capturing control part are disposed separately, but the present invention is not limited to this, and at least two of the drive control part, the reflection drive control part, and the image capturing control part may be composed of one control part.

Further, although bearing portion 114A is provided in the above embodiment, the present invention is not limited to this, and the present invention does not have to be provided with any bearing portion.

In addition, in the above embodiment, absorbing part 613 is provided, but the present invention is not limited thereto, and no absorbing part may be provided.

For example, while a smartphone serving as a camera-equipped mobile terminal has been described in the above embodiment as an example of the camera-mounted device including camera module 1, the present invention is applicable to a camera-mounted device including a camera module and an image processing part that processes image information obtained by the camera module. The camera-mounted device encompasses an information apparatus and a transporting apparatus. Examples of the information apparatus include a camera-mounted mobile phone, a note-type personal computer, a tablet terminal, a mobile game machine, a web camera, drone, and a camera-mounted in-vehicle device (for example, a rear-view monitor device or a drive recorder device). In addition, examples of the transporting apparatus include an automobile, drone, and/or the like.

Figure 29A:
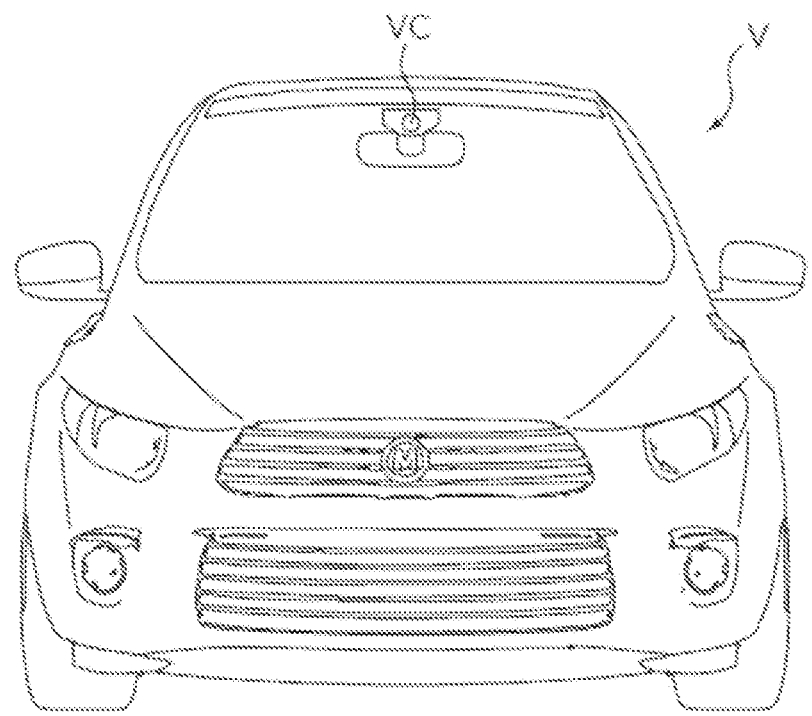
FIG. 29A is a diagram illustrating an automobile in which the camera module is mounted.
Figure 29B:
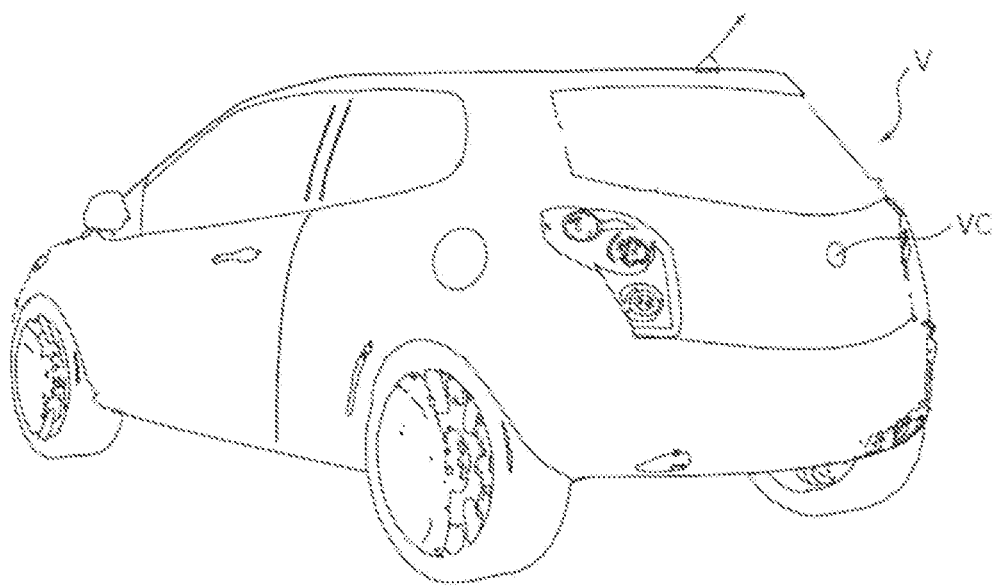
FIG. 29B is a diagram illustrating the automobile in which the camera module is mounted.

FIGS. 29A and 29B illustrate automobile V serving as the camera-mounted device in which in-vehicle camera module VC (Vehicle Camera) is mounted. FIG. 29A is a front view of automobile V and FIG. 29B is a rear perspective view of automobile V. In automobile V, camera module 1 described in the embodiment is mounted as in-vehicle camera module VC. As illustrated in FIGS. 29A and 29B, in-vehicle camera module VC may, for example, be attached to the windshield so as to face forward, or to the rear gate so as to face backward. In-vehicle camera module VC is used for rear monitoring, drive recording, collision avoidance control, automatic drive control, and the like.

In addition, the aforementioned embodiments merely describe examples of implementations for practicing the present invention, and should not be construed as limiting the technical scope of the present invention. That is, the present invention can be embodied in various forms without departing from the spirit, scope, or principal features of the present invention. For example, the shape, size, number, and material of each part described in the above embodiment are merely examples, and can be changed as appropriate.

The disclosure of U.S. provisional Patent Application No. 63/002,300, filed on Mar. 30, 2020, including the specification, drawings and abstract is incorporated herein by reference in its entirety.

Industrial Applicability

The lens driving device according to the present invention is useful as a lens driving device, a camera module, and a camera-mounted device capable of accurately detect the position of a movable lens.

REFERENCE SIGNS LIST

1 Camera module
10 Housing

11 Side wall portion
12 Bottom wall portion
20 Reflection driving part
21 Reflecting housing
22 Mirror
23 Reflection drive control part
30 Lens part
31 First lens unit
32 Second lens unit
32A Main body portion
32B Supported portion
33 Third lens unit
33A Main body portion
33B Supported portion
34 Fourth lens unit
34A Protruding portion
40 Image capturing part
50 Support shaft
60 Lens driving part
61 Frame
62 Connecting part
63 Interposition part
64 Ultrasonic motor
70 Position detecting part
80 Guide part
81 First guide shaft
82 Second guide shaft
100 Drive control part
111 First wall
111A Placement portion
111B Engaged portion
111C Terminal portion
112 Second wall
112A Supporting portion
112B Placement portion
112C Guide supporting portion
112D Opening portion
113 Third wall
113A Bridging portion
113B Supporting portion
113C Guide supporting portion
114 Fourth wall
114A Bearing portion
121 Positioning portion
122 Bent portion
123 Half punch
200 Image capturing control part
611 Guided portion
611A First portion
611B Second portion
611C Third portion
611D Fourth portion
612 Magnet holding portion
613 Absorbing part
614 Magnet part
614A First pole
614B Second pole
614C Opposing surface
614D Border
631 First interposition member
631A Engaging hole
631B Engaging hole
632 Second interposition member
632A Main body portion
632B Contact portion
632C Connecting portion
632D Connecting section
641 Resonant portion
641A Body portion
641B Oscillator
641C Protruding portion
641D Energization portion
642 Piezoelectric element
643 First electrode
643A Clamping portion
643B Electrode part
644 Second electrode

What is claimed is:

1. A lens driving device, comprising:
a movable part disposed in a direction of an optical axis and configured to hold a movable lens;
a driving part for driving the movable part in the direction of the optical axis;
a magnet part disposed on the movable part, extending in the direction of the optical axis, and having a first pole and a second pole disposed adjacently to each other via a border in a width direction orthogonal to the direction of the optical axis; and
a position detecting part disposed to face the magnet part and configured to detect a position of the magnet part by sensing a magnetic field in a plane including the direction of the optical axis and the width direction, wherein
the border extends in a curved manner such that an angle formed between the border and the direction of the optical axis changes.

2. The lens driving device according to claim 1, wherein the border extends in a curved manner so as to be displaced from a side of the first pole toward a side of the second pole in the width direction along a course from an end portion of the magnet part on one side in the direction of the optical axis to a predetermined position, and displaced from the side of the second pole toward the side of the first pole in the width direction along a course from the predetermined position to an end portion of the magnet part on an other side in the direction of the optical axis.

3. The lens driving device according to claim 1, wherein the border extends to curve such that the angle formed between the border and the direction of the optical axis changes continuously.

4. The lens driving device according to claim 1, wherein the border extends in a curved manner to form a magnetic field in which a direction of magnetic flux at a portion of the magnet part facing the position detecting part changes with movement of the magnet part.

5. The lens driving device according to claim 1, wherein the border extends to curve in an arc shape.

6. The lens driving device according to claim 1, wherein:
the magnet part extends linearly along the direction of the optical axis, the magnet part having a constant width, and
a ratio of a width of the first pole to a width of the second pole changes because of the border extending in a curved manner.

7. The lens driving device according to claim 1, wherein the position detecting part includes a magnetoresistive element.

8. The lens driving device according to claim 1, wherein the position detecting part includes a plurality of magnetoresistive elements disposed side by side in the direction of the optical axis.

9. The lens driving device according to claim 1, wherein:
the movable part includes a first movable part and a second movable part that are disposed in the direction of the optical axis and are configured to hold a first movable lens and a second movable lens, respectively,
the driving part includes a first driving part and a second driving part, both of which are disposed on one end side of opposite ends of the first movable part and the second movable part with respect to the optical axis, the first driving part and the second driving part being configured to drive the first movable part and the second movable part in the direction of the optical axis, respectively, and
the magnet part is disposed on each of the first movable part and the second movable part.

10. The lens driving device according to claim 9, wherein:
the first driving part includes a first ultrasonic motor and a first frame connected to the first movable part,
the second driving part includes a second ultrasonic motor and a second frame connected to the second movable part, and
the first ultrasonic motor and the second ultrasonic motor are disposed side by side in the direction of the optical axis on the one end side, and are configured to respectively drive the first movable part and the second movable part independently in the direction of the optical axis.

11. A camera module, comprising:
a lens driving device according to claim 1;
a lens part including the movable lens held by the movable part; and
an image capturing part configured to capture a subject image imaged by the lens part, wherein
the movable lens is driven in the direction of the optical axis.

12. A camera-mounted device that is an information apparatus or a transporting apparatus, the camera-mounted device comprising:
a camera module according to claim 11; and
an image capturing control part that processes image information obtained by the camera module.

* * * * *